United States Patent
Okuno

(10) Patent No.: US 6,287,230 B1
(45) Date of Patent: Sep. 11, 2001

(54) POWER TRANSMISSION BELT AND ELASTOMER COMPOSITION

(75) Inventor: Shigeki Okuno, Kobe (JP)

(73) Assignee: Bando Chemical Industries Ltd., Kobe (JP)

( * ) Notice: Subject to any disclaimer, the term of this patent is extended or adjusted under 35 U.S.C. 154(b) by 0 days.

(21) Appl. No.: 09/456,415

(22) Filed: Dec. 8, 1999

(30) Foreign Application Priority Data

Dec. 8, 1998 (JP) .................................................. 10-348740

(51) Int. Cl.$^7$ ........................................................ F16G 5/20
(52) U.S. Cl. ............................................. 474/237; 474/260
(58) Field of Search .................................. 474/237, 260, 474/261, 263, 264

(56) References Cited

U.S. PATENT DOCUMENTS

| | | | |
|---|---|---|---|
| 4,269,746 | 5/1981 | Tabar et al. | 260/23.7 H |
| 4,605,705 | 8/1986 | Takeshita | 525/330.9 |
| 5,314,140 * | 5/1994 | Rotter | 242/192 |
| 5,861,212 * | 1/1999 | Mori et al. | 428/375 |

FOREIGN PATENT DOCUMENTS

| | | |
|---|---|---|
| 0 419 055 A1 | 3/1991 | (EP) . |
| 1 590 802 | 6/1981 | (GB) . |

* cited by examiner

Primary Examiner—David A. Bucci
Assistant Examiner—Vicky A. Johnson
(74) Attorney, Agent, or Firm—Connolly Bove Lodge & Hutz

(57) ABSTRACT

This invention is related to a power transmission belt comprising a bottom rubber layer comprising an elastomer, wherein the bottom rubber layer satisfies the relation represented by the following formula (1):

$$X/Y \geq 2.5 \qquad (1)$$

in the formula, X is the change in mg in the weight of said layer after 500 wear cycles under a load of 500 grams in Taber's abrasion resistance test with a sand paper (C1500) having a particle size of 10 μm as the counter material and Y is the area in cm$^2$ of contact between said counter material and the rubber face of the belt.

20 Claims, 8 Drawing Sheets

POWER TRANSMISSION BELT AND ELASTOMER COMPOSITION

FIELD OF THE INVENTION

The present invention relates to an elastomer composition such that the powder resulting from abrasion thereof is prevented from adhering to the counterpart member such as a pulley and to the elastomer surface, and to a power transmission belt comprising said elastomer composition as a component thereof and reduced in abnormal sound emission during running and improved in durability.

PRIOR ART

Power transmission belts are widely used as friction power transmission belts, for example V belts and V rib belts, such as lapped belts and low edge belts, and further as mating power transmission belts, for example timing belts, in the automobile industry and for general industrial purposes. These power transmission belts are generally constituted of an adhesive rubber layer 32 with core wires 31 comprising a polyester or aramide fiber as embedded therein and a compressed rubber layer (bottom rubber layer) 33 layered on said adhesive rubber layer 32, where necessary together with an upper canvas 34 and/or a lower canvas 35, respectively adhered to the above assembly, as shown in FIG. 8.

The elastomer to be used in such power transmission belts is required to have adhesiveness to fibers, resistance to flexing fatigue and like characteristics, in addition to such general characteristics as heat resistance, oil resistance and wear resistance. Among the elastomers so far used widely, natural rubbers, epichlorohydrin rubbers, acrylic rubbers, chloroprene rubbers and the like, in particular, readily form adhesive abrasion dust powders as a result of wear in sliding portions and the phenomenon of such abrasion dust powders sticking to the elastomer surface (hereinafter this phenomenon is referred to as "adhesion wear") tends to occur. When adhesion wear occurs, the power transmission performance of the power transmission belt is adversely affected and, as a result of abnormal interference with the counter material in sliding portions during running of the belt, abnormal or strange sounds may be emitted and/or other troubles may occur.

The means so far taken to prevent such adhesion wear from occurring comprise (1) increasing the hardness of the elastomer or (2) reducing the coefficient of friction of the elastomer surface, among others. As concrete methods generally employed for realizing the means (1), there may be mentioned, among others, the method comprising increasing the crosslinking density of the elastomer and the method comprising increasing the content of the reinforcing agent, such as carbon black. By such means, the occurrence of adhesion wear can be prevented to some extent. However, the means comprising increasing the hardness has problems; if the hardness is increased to an extent such that the occurrence of adhesion wear can be prevented, the processability of the elastomer may become poor and, if the amount of the reinforcing agent is increased excessively or the crosslinking density is increased excessively, the final product may show so high elastic modulus that the durability of the product under repeated strain and stress may be worsened.

As concrete methods for realizing the means (2), there may be mentioned, among others, the method comprising incorporating a short fiber in the elastomer in an amount sufficient to allow exposure thereof on the elastomer surface, and the method comprising subjecting the elastomer to surface treatment with chlorine, corona, ultraviolet radiation or the like. However, the problem is that these methods readily induce surface cracks.

SUMMARY OF THE INVENTION

In view of such state of the art, the present invention has for its object to provide a power transmission belt which is prevented from occurring the adhesion wear, hence from emitting strange sounds during running, and which is excellent in durability as well as an elastomer composition suited for constituting said belt and showing good processability.

In accordance with a first aspect of the present invention, there is provided a power transmission belt having a bottom rubber layer comprising an elastomer, wherein the bottom rubber layer satisfies the relation represented by the following formula (1)

$$X/Y \geq 2.5 \tag{1}$$

in the formula, X is the change in mg in the weight of said layer after 500 wear cycles under a load of 500 grams in Taber's abrasion resistance test with a sand paper (C1500) having a particle size of 10 μm as the counter material and Y is the area in cm of contact between said counter material and the rubber face of the belt.

In accordance with a second aspect of the present invention, there is provided an elastomer composition wherein the change in the weight of said composition in Taber's abrasion resistance test amounts to 40 mg when the test is carried out under the condition of 500 wear cycles, a load of 500 grams and not greater than 20 μm of the particle size of the counter material of sand paper.

In accordance with a third aspect of the present invention, there is provided a power transmission belt comprising the above elastomer composition as the constituent material thereof.

BRIEF DESCRIPTION OF THE DRAWINGS

In FIGS. 1, 2 and 8, the reference number 11 indicates a rubber coat canvas, 12 and 31 each a core wire, 13 and 32 each an adhered rubber layer, 14 a rib, 15 and 33 each a bottom rubber layer, 21, 22, 23 and 24 each a pulley, 34 an upper canvas, and 35 a lower canvas.

DETAILED DESCRIPTION OF THE INVENTION

Figure 1:
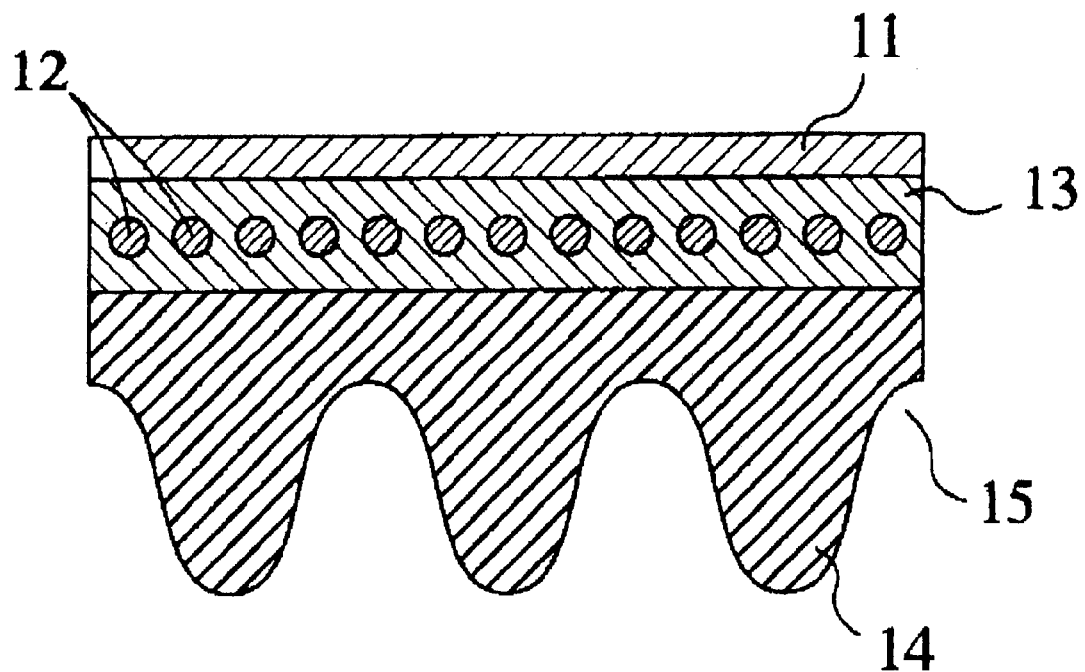
FIG. 1 is a schematic drawing, in cross section, of the power transmission belt used in carrying out the belt adhesiveness test in the examples and comparative examples for illustrating the present invention.

In the following, the above aspects of the present invention are described in detail.

The power transmission belt according to the first aspect of the present invention comprises a bottom rubber layer comprising an elastomer, wherein the bottom rubber layer satisfies the relation represented by the following formula (1)

$$X/Y \geq 2.5 \tag{1}$$

in the formula, X is the change in mg in the weight of said layer after 500 wear cycles under a load of 500 grams in Taber's abrasion resistance test with a sand paper (C1500) having a particle size of 10 μm as the counter material and Y is the area in $cm^2$ of contact between said counter material and the rubber face of the belt.

In its first aspect, the present invention has been completed based on the finding, obtained for the first time by the present inventors, that when the values obtained in Taber's abrasion resistance test satisfy the above relation, the object of the present invention can be attained.

Generally, in Taber's abrasion resistance test, a square sheet-like test specimen is mounted on a rotary disk, an abrasive wheel is brought into contact with said test specimen under a predetermined load, the rotary disk is then rotated continuously and, after a predetermined number of rotations, the change in the weight (weight loss due to wear) of said test specimen is determined. In the case of said first aspect of the present invention, Taber's abrasion resistance test is carried out using an assembly of bottom rubber layer pieces as the test specimen and a sand paper (C1500) having a particle size of 10 μm as the counter material corresponding to the abrasive wheel, where said bottom rubber layer pieces are cut from the above-mentioned power transmission belt having a bottom rubber layer comprising an elastomer and are spread all over a square with a size 10 cm×10 cm.

The load of 500 grams means that, in contacting the sand paper with the belt-derived test specimen, the load to be added is 500 gf. The term "500 wear cycles" means that the change in weight is measured after 500 rotations of said belt specimen in contact with said sand paper. On that occasion, only part of said belt specimen contacts with the counter material, so that, taking into consideration the area of that portion which contacts with the counter material, said change in weight is expressed in terms of weight change per unit contact area (X/Y) In accordance with the first aspect of the present invention, the adhesion (adherence) to the counter material, such as a pulley, and to the belt surface when the above belt is used as a power transmission belt decreases as the weight change per unit contact area in Taber's abrasion resistance test carried out under the conditions mentioned above increases and, more concretely, the power transmission belt comprising a bottom rubber layer satisfying the relation represented by the following formula (1):

$$X/Y \geq 2.5 \tag{1}$$

(wherein X is the change in mg in the weight of said layer when a sand paper having a particle size of 10 μm is used as the counter material and Y is the area in $cm^2$ of contact between said counter material and the rubber face of the belt) is prevented from undergoing adhesion wear and, as a result, can be prevented from emitting abnormal sounds when said belt is driven; thus, a belt excellent in power transmission performance can be provided.

When the value X/Y is less than 2.5, adhesive abrasion dust powders may readily be formed, or the stickiness of the bottom rubber layer itself will increase, so that the adhesive abrasion dust powders can readily stick to the counter material and belt surface. As a result, it becomes difficult to prevent abnormal sound emission while the belt is driven. More preferred for said value is the range represented by the following formula (6):

$$6 \geq X/Y \geq 2.5 \tag{6}$$

The elastomer to be used in the bottom rubber layer of the above power transmission belt is not particularly restricted but includes, among others, chloroprene rubbers, natural rubbers, nitrile rubbers, styrene-butadiene rubbers, butadiene rubbers, ethylene-propylene rubbers, chlorosulfonated polyethylene rubbers, acrylic rubbers and urethane rubbers. These may be used singly or two or more of them may be used in combination. Judiciously used among them are chloroprene rubbers, however.

The elastomer composition according to the second aspect of the present invention is an elastomer composition wherein the particle size of the counter material of sand paper, in the case that the change in the weight of said composition amounts to 40 mg in Taber's abrasion resistance test under the condition of 500 wear cycles and a load of 500 grams, is not greater than 20 μm.

The second aspect of the present invention has been completed by the finding obtained for the first time by the present inventors and indicating that, when the above relation exists between the value obtained in Taber's abrasion resistance test and the particle size of the counter material sandpaper, the object of the present invention can be attained.

In the second aspect of the present invention, Taber's abrasion resistance test is carried out in the same manner as mentioned above in relation to the belt according to the first aspect of the present invention except that a sheet specimen in ordinary use is used as the test specimen.

According to the second aspect of the present invention, as the particle size of the counter material sand paper is decreased when the change in the weight of said composition amounts to 40 mg in Taber's abrasion resistance test under the condition of 500 wear cycles and a load of 500 grams, the adhesion of the abrasion dust powders to the counter material and belt surface as encountered, in case of that the above elastomer composition is used as the bottom rubber layer of power transmission belts, is decreased. Therefor, when a power transmission belt comprises the bottom rubber layer comprising the above elastomer composition, where the particle size of sand paper is not greater than 20 $\mu$m in case that the change in the weight amounts to 40 mg in the test under the above condition, such belt (hereinafter simply referred to as "belt in which the above elastomer composition is used") is free from adhesion wear and from abnormal sounds, and therefore has good power transmission performance.

When the particle size of the counter material sand paper as required for the weight change to amount to 40 mg under the above conditions is greater than 20 $\mu$m, the adhesion to the counter material and rubber surface will increase and therefore, when the belt in which the above elastomer composition is used is driven, adhesion wear tends to occur and abnormal sounds can hardly be prevented from being emitted.

The above elastomer composition is not particularly restricted but any one having the above-mentioned characteristic relative to Taber's abrasion resistance test can be used to satisfactorily prevent adhesion wear. However, in cases where the means comprising increasing the hardness of the elastomer composition is taken to prevent adhesion wear, the durability of the product is generally worsened. Therefore, from the viewpoint of satisfactory adhesion wear prevention and of product durability improvement, it is preferred that the elastomer composition have a tensile product of not less than 50 MPa.

Said tensile product is defined as the product of the tensile strength and elongation at break measured in a tensile test (JIS K 6301). In calculating said product, the tensile strength is expressed in MPa and the tensile strain at break (dimensionless) is used as the elongation at break.

The above elastomer composition preferably comprises an elastomer and an inorganic filler. By incorporating said inorganic filler, it is possible to suppress the decrease in the tensile product of the product obtained and prevent adhesion wear from occurring.

Said inorganic filler is not particularly restricted but includes, among others, carbon black species low in reinforcing action, such as MT and FT; clays such as hard clay and aluminum silicate; calcium carbonate; silica; talc; alumina; and modifications of these as resulting from surface treatment with a coupling agent. Among these, clay, calcium carbonate and silica are judiciously used. They may be used singly or two or more of them may be used combinedly.

The addition amount of said inorganic filler is 0.1 to 30 parts by weight per 100 parts by weight of the elastomer. If said amount is less than 0.1 part by weight, it will be impossible to efficiently prevent adhesion wear from occurring in the product obtained. If it is above 30 parts by weight, the tensile product of the product obtained will become low and a durability problem will arise. The above range is thus rather critical, and the range of 5 to 20 parts by weight is preferred.

The above elastomer is not particularly restricted but may be any of those specifically mentioned hereinabove. Among them, chloroprene rubbers are preferred, however.

In the above elastomer composition, there may be incorporated one or more of various additives, if necessary.

Said additives are not particularly restricted but include, among others, reinforcing agents such as carbon black; lubricants such as stearic acid; crosslinking agents such as sulfur, organic sulfur compounds and metal peroxides; vulcanization accelerators such as thiazoles, dithiocarbamates, guanidines and thiurams; antioxidants such as amines and phenols; and stabilizers such as dimethyl phthalate, diethyl phthalate and dioctyl phthalate. These may be used singly or two or more of them may be used combinedly.

The addition amount of such an additive is not particularly restricted but may judiciously be determined depending on the additive species employed and other factors.

The elastomer composition comprising chloroprene rubber is preferably composed of a sulfur modified chloroprene rubber, a vulcanization accelerator, zinc oxide and magnesium oxide. Said sulfur modified chloroprene rubber is not particularly restricted but includes, among others, those represented by the following general formula (II):

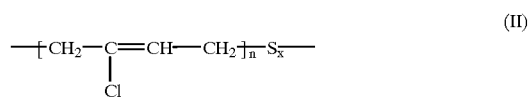
(II)

wherein x represents an integer of 2 to 6 and n represents 80x to 110x.

Said vulcanization accelerator is not particularly restricted but includes, among others, those of the thiourea, thiuram, thiazole or sulfenamide type, and red lead ($Pb_3O_4$). Among them, thiourea compounds represented by the general formula (I):

(I)

are preferred.

In the above general formula (I), $R^1$, $R^2$, $R^3$ and $R^4$ each independently represents a hydrogen atom or a hydrocarbon group containing 1 to 12 carbon atoms. These may be the same or different, but at least three selected from the group consisting of $R^1$, $R^2$, $R^3$ and $R^4$ is a hydrocarbon group containing 1 to 12 carbon atoms. If at least three each is not a hydrocarbon group containing 1 to 12 carbon atoms, the adhesion wear preventing effect of the product will be reduced.

As specific examples of said thiourea compounds, which are not particularly restricted, there may be mentioned, among others, thiourea compounds having alkyl groups containing 1 to 12 carbon atoms, such as trimethylthiourea, triethylthiourea, tripropylthiourea, tributylthiourea, tetramethylthiourea, tetraethylthiourea, tetrapropylthiourea and tetrabutylthiourea; and thiourea compounds having an aryl group containing 1 to 12 carbon atoms, such as phenyldimethylthiourea, phenyltrimethylthiourea and phenyldiethylthiourea. These may be used singly or two or more of them may be used in combination. Among them, trimethylthiourea, triethylthiourea and tetramethylthiourea are preferred, and trimethylthiourea and tetramethylthiourea are more preferred.

In the above sulfur modified chloroprene rubber composition, the proportion M0 (parts by weight) of the vulcanization accelerator per 100 parts by weight of the sulfur modified chloroprene rubber is 0.1 to 5 parts by weight. If it is less than 0.1 part by weight, the product may emit abnormal sounds during use. If it is above 5 parts by weight, the modulus of the product will become excessively high, leading to worsening of dynamic properties, for example bending resistance, and to shortening of the product life. The above range is thus rather critical. A preferred range is 0.15 to 3 parts by weight.

In the above sulfur modified chloroprene rubber composition, there are incorporated zinc oxide and magnesium oxide.

The proportion M1 (parts by weight) of zinc oxide and the proportion M2 (parts by weight) of magnesium oxide, per 100 parts by weight of the sulfur modified chloroprene rubber, are determined in the following manner.

First, a plurality of compositions composed of 100 parts by weight of the sulfur modified chloroprene rubber, M0 parts by weight of the vulcanization accelerator, zinc oxide and magnesium oxide are prepared. In other words, a plurality of compositions are prepared such that the proportions of zinc oxide and magnesium oxide are respectively varied and otherwise said composition have the same composition as the above-mentioned sulfur modified chloroprene rubber composition.

Then, as to each composition mentioned above, using the proportion m1 (parts by weight) of zinc oxide, the proportion m2 (parts by weight) of magnesium oxide, per 100 parts by weight of the sulfur modified chloroprene rubber, and the Mooney scorching time value (ML 125° C., $t_{35}$) t (minutes), the coefficients A, B, C, D, E and F in the following formula (2):

$$t = A(m1)^2 + B(m2)^2 + C(m1)(m2) + D(m1) + E(m2) + F \quad (2)$$

are determined experimentally according to the type of the vulcanization accelerator contained in said plurality of compositions and the proportion M0 (parts by weight) thereof.

Thereafter, the relationship of t1 to M1 and M2 as represented by the formula (3):

$$t1 \leq A(M1)^2 + B(M2)^2 + C(M1)(M2) + D(M1) + E(M2) + F \quad (3)$$

is established.

In the above formula (3), t1 is the Mooney scorching time (ML 125° C., $t_{35}$) of a sulfur modified chloroprene rubber-based standard formulation (standard formula 2A defined in ASTM D 3190) composed of 100 parts by weight of the above sulfur modified chloroprene rubber, 5 parts by weight of zinc oxide, 4 parts by weight of magnesium oxide, 0.5 part by weight of stearic acid and 30 parts by weight of SRF carbon black. A, B, C, D, E and F are the numerical values determined in the above manner.

When, for instance, trimethylthiourea is used as the vulcanization accelerator and the proportion thereof is 0.5 part by weight per 100 parts by weight of the sulfur modified chloroprene rubber, the above formula (3) may specifically be shown by the following formula (4):

$$12 \leq 0.0166(M1)^2 - 0.0471(M2)^2 - 0.3604(M1)(M2) - 0.5000(M1) + 3.3823(M2) + 4.4582 \quad (4)$$

The proportion M1 (parts by weight) of zinc oxide and the proportion M2 (parts by weight) of magnesium oxide, per 100 parts by weight of the sulfur modified chloroprene rubber, are more preferably determined as values satisfying the above formula (4).

When the proportion M1 (parts by weight) of zinc oxide and the proportion M2 (parts by weight) of magnesium oxide are determined in the above-mentioned manner, said sulfur modified chloroprene rubber composition can realize good product life and prevention of adhesion wear. Furthermore, in spite of incorporation of a vulcanization accelerator therein, said composition has a scorching time comparable to or longer than that of the corresponding composition containing no vulcanization accelerator and thus becomes superior in processability.

However, an excessively long scorching time results in a slow rate of vulcanization, hence an excessively prolonged time for processing. Therefore, it is more preferred that the proportion M1 (parts by weight) of zinc oxide and the proportion M2 (parts by weight) of magnesium oxide have values satisfying the relation represented by the following relation (7):

$$t1 \leq A(M1)^2 + B(M2)^2 + C(M1)(M2) + D(M1) + E(M2) + F \leq t1 + 20 \quad (7)$$

(wherein, A, B, C, D, E, F and t are defined as above.).

In the above sulfur modified chloroprene rubber composition, there may be incorporated one or more of various additives, if necessary.

Said additives are not particularly restricted but include, among others, auxiliary agents such as carbon black; lubricants such as stearic acid; crosslinking agents such as sulfur, organic sulfur compounds and metal peroxides; vulcanization accelerators such as thiazoles, dithiocarbamates, guanidines and thiurams; antioxidants such as amines and phenols; fillers such as calcium carbonate, basic magnesium carbonate, diatomaceous earth and clay; and stabilizers such as dimethyl phthalate, diethyl phthalate and dioctyl phthalate. These may be used singly or two or more of them may be used combinedly.

The addition amount of such an additive is not particularly restricted but may judiciously be determined depending on the type of additives employed and other factors.

The elastomer composition mentioned above preferably comprises a sulfur modified chloroprene polymer which is produced by using elemental sulfur in an amount within a specified range in the step of polymerization, and has the product of the tan δ measured in the raw rubber state and the cube of the number average molecular weight thereof (Mn)³ not more than a specific value ($3 \times 10^{14}$).

The loss tangent, namely tan δ, is defined as loss modulus (G")/storage elastic modulus (G') and can be determined by carrying out a viscoelasticity test. The viscoelasticity test includes various methods. For the above elastomer composition, the viscoelasticity test is carried out using parallel plates having a diameter of 25 mm in the shear mode in the linear strain range of 1.7 to 4% in an atmosphere maintained at 120° C., by vibrating said parallel plates at a frequency of 0.1 rad/s and measuring the loss modulus (G") and storage elastic modulus (G') Based on these values, the tan δ value is calculated.

The number average molecular weight (Mn) by GPC can be obtained using an apparatus employing a method of determining the content of a polymer in a solvent by measuring the refractive index and subjecting a sample dissolved in THF to GPC using a monodisperse polystyrene as a standard sample. The number average molecular weight is calculated based on the peak or peaks corresponding to polymer components having a molecular weight of not less than 2,500.

Said product $\tan \delta \times (Mn)^3$ can be used as an indicator of the viscosity of the sulfur modified chloroprene polymer. If said $\tan \delta \times (Mn)^3$ value is below the value specified above, the raw material rubber will have a low viscosity and the elastomer composition comprising said raw material rubber will be more efficiently prevented from undergoing adhesion wear. A low viscosity of the rubber, as so referred to in the present specification, means a high elasticity of the rubber.

When the sulfur modified chloroprene polymer is produced by using elemental sulfur in an amount of 0.6 to 1.2 parts by weight per 100 parts by weight of the monomer in the step of polymerization and satisfies the relation represented by the following formula (5) in relation to the tan δ of the raw material rubber before vulcanization and the number average molecular weight (Mn) thereof determined by GPC analysis and expressed in terms of polystyrene equivalent, said polymer is highly elastic and the adhesion wear of the belt caused by using an elastomer composition comprising said chloroprene polymer on the occasion of driving of said belt is suppressed and abnormal sound emission is also suppressed. The belt is thus excellent in power transmission performance.

$$\tan \delta \times (Mn)^3 \leq 3 \times 10^{14} \qquad (5)$$

When the value of $\tan \delta \times (Mn)^3$ exceeds $3 \times 10^{14}$, the raw material rubber is highly viscous and, when the belt is driven, adhesion wear may readily occur and abnormal sound emission will be hardly suppressed.

The above elastomer composition preferably comprises a sulfur modified chloroprene polymer with the low-molecular component content in the THF-soluble fraction thereof reduced to a specific level or below.

When the elastomer composition comprises a sulfur modified chloroprene polymer having not more than 4.0% of the fraction of low-molecular components with a polystyrene equivalent molecular weight of not more than 2,500 as determined by GPC analysis of the THF-soluble fraction of the sulfur modified chloroprene polymer raw rubber, said elastomer composition is low in adhesiveness and the adhesion wear of the belt caused by using an elastomer composition on the occasion of driving of said belt is suppressed and abnormal sound emission is also suppressed. The belt is thus excellent in power transmission performance.

When the fraction of said low-molecular components exceeds 4.0%, adhesion wear may readily occur and abnormal sound emission on the occasion of driving of the belt may become difficult to suppress in some instances.

The above elastomer composition preferably comprises a sulfur modified chloroprene polymer having the content of the free thiuram stabilizer remained in the raw material rubber obtained after the steps of washing and drying within a specific range.

Said sulfur modified chloroprene polymer is either a homopolymer of 2-chloro-1,3-butadiene (chloroprene) (hereinafter, "chloroprene homopolymer") or a copolymer of chloroprene (A) and a monomer (B) copolymerizable therewith (hereinafter, "chloroprene copolymer") in which the proportion of (A) is 100% by weight>(A)≧85% by weight and the proportion of (B) is 0% by weight<(B)≦15% by weight.

Said monomer copolymerizable with chloroprene is not particularly restricted but may be, for example, 2,3-dichloro-1,3-butadiene. When the amount of said monomer is above 15% by weight, the tensile strength, elongation and other properties may unfavorably decrease. The amount of the monomer copolymerizable with chloroprene is therefore limited to 15% by weight or below, preferably 10% by weight or below.

The above sulfur modified chloroprene polymer comprises the chloroprene homopolymer or chloroprene copolymer mentioned above terminally stabilized with a tetraalkylthiuram disulfide (a) and/or a dialkylxanthogen disulfide (b), each alkyl group of which contains 1 to 6 carbon atoms, as well as 0.2 to 1.1% by weight of the free form of (a) and/or (b).

The alkyl groups containing 1 to 6 carbon atoms in said tetraalkylthiuram disulfide (a) or dialkylxanthogen disulfide (b) are not particularly restricted but include, among others, methyl, ethyl, propyl, isopropyl, butyl, isobutyl, pentyl and hexyl. Said tetraalkylthiuram disulfide (a) and/or dialkylxanthogen disulfide (b) is added as a stabilizer to the reaction mixture after completion of the polymerization reaction and cleaves the sulfur bond of the polymer, whereby the molecular weight of the polymer is reduced.

When said stabilizer remains in the polymer in an amount above a certain level, the stabilizer itself is a low-molecular compound. Therefor, when the belt comprises the elastomer composition comprising the above sulfur modified chloroprene polymer, it is liable to undergo adhesion wear. If the content of the free form of the above component (a) and/or or (b) is less than 0.2% by weight, the addition amount of (a) and/or (b) is lower than the required level, hence the molecular weight of the above polymer becomes excessively high, making the polymer hardly soluble in solvents and the handling thereof difficult. If it exceeds 1.1% by weight, the content of low-molecular compounds increases and, when the belt comprising the sulfur modified chloroprene polymer is driven, adhesion wear may readily occur and abnormal sound emission becomes difficult to suppress. Therefore, the content of the free form of (a) and/or (b) is limited to the above range.

Since the sulfur modified chloroprene polymer has the above constitution, the elastomer composition comprising said sulfur modified chloroprene polymer is high in adhesion wear preventing effect.

The sulfur modified chloroprene polymer can be prepared by obtaining an ultrahigh-molecular-weight polymer from monomeric chloroprene (or monomeric chloroprene and a monomer copolymerizable therewith), sulfur, an emulsifier and a polymerization initiator, adding the stabilizer to reduce the molecular weight, followed by washing and drying.

As an example of the above process for producing the sulfur modified chloroprene polymer, when T(°C.), S (parts by weight) and P (% by weight) respectively represent the temperature at polymerization, the amount of elemental sulfur per 100 parts by weight of monomer(s) used and the content of the free form of the stabilizer (a) and/or (b) based on the whole amount of the polymer, there can be mentioned the process in which T, S and P satisfy all the relations represented by the following formulas (8) to (10) and at least one of the relations represented by the following formulas (11) to (13);

$$0.2 \leq P \leq 2.0 \quad (8)$$

$$0.2 \leq S \leq 1.2 \quad (9)$$

$$38 \leq T \leq 52 \quad (10)$$

$$0.2 \leq P \leq 1.1 \quad (11)$$

$$0.8 \leq S \leq 1.2 \quad (12)$$

$$42 \leq T \leq 52 \quad (13)$$

By using the above process, sulfur modified chloroprene polymer, in which adhesion wear and abnormal sound emission can be suppressed when driving the belt and the power transmission performance is excellent, can be obtained.

In the conventional polymerization processes, the ordinary conditions are as follows: P=1.4, S=0.6 and T=40. These conditions satisfy the above relations represented by (8), (9) and (10) but do not satisfy any of the above relations represented by (11), (12) and (13). Satisfying at least one of the above relations represented by (11), (12) and (13) means to take at least one of the means one of which comprises reducing the amount (P) of the free form stabilizer, one of which comprises increasing the amount (S) of sulfur and the other of which comprises raising the polymerization temperature (T), as compared with the conventional processes. By taking such means, adhesion wear and abnormal sound emission can be suppressed when driving the belt in which the elastomer composition comprising the raw material rubber obtained is used, and the belt shows good power transmission performance characteristics.

In addition to the production process mentioned above, there are other methods of reducing the residual content of low-molecular-weight impurities in the elastomer, for example the method comprising increasing the number of washing procedures in the step of washing the elastomer synthesized by a conventional polymerization method.

In accordance with the third aspect of the present invention, there is provided a power transmission belt comprising the above elastomer composition as a constituent material.

By using the above-mentioned elastomer composition as a constituent material thereof, said power transmission belt becomes excellent in power transmission performance, with adhesion wear being suppressed and abnormal sound emission being suppressed.

BEST MODE FOR CARRYING OUT THE INVENTION

The following examples illustrate the present invention in further detail. They are, however, by no means limitative of the scope of the present invention.

PRODUCTION EXAMPLE

Production of Chloroprene Rubber

A chip-form rubber was produced by ordinary emulsion polymerization.

First, a reaction vessel was charged with the monomer (1) and sulfur (S) in the proportions given below in Table 1, potassium rosinate (as an emulsifier) and potassium persulfate (as a polymerization initiator) were then added, and the polymerization was carried out at the temperature specified in Table 1. After initiation of polymerization, when the conversion reached 80%, tetrathiuram disulfide was added, as a stabilizer, in the proportion given in Table 1 and the plasticization was allowed to proceed for 20 hours. The polymer thus obtained was washed and dried to give a chip-form rubber with a Mooney viscosity of 30 to 50. The rubber obtained was designated as shown in Table 1.

Table 1

| Polymer (designation) | | B32 | B33 | B44 | B47 | B48 | B49 | B72 | B73 |
|---|---|---|---|---|---|---|---|---|---|
| Raw materials | monomer(1) | 100 | 100 | 100 | 100 | 100 | 100 | 100 | 100 |
| | Sulfur(S) | 0.6 | 0.6 | 0.6 | 0.9 | 0.9 | 0.9 | 0.9 | 0.9 |
| | Plasticizer | 1.8 | 1.8 | 1.3 | 1.3 | 1.8 | 2.2 | 1.3 | 0.8 |
| Polymerization Temp. T(° C.) | | 44 | 48 | 40 | 40 | 40 | 40 | 48 | 48 |

In the above table, "monomer (1)" indicates 2-chloro-1, 3-butadiene, "sulfur (S)" indicates colloidal sulfur, and the proportions are given in parts by weight.

Examples 1 to 41 and Comparative Examples 1 to 6

Using the respective elastomers specified in Table 2 and according to the formulations shown in Tables 3, 4, 5 and 10, vulcanized rubber sheets, 10 cm×10 cm in size and 2 mm in thickness, were produced under the vulcanization conditions shown in Tables 7, 8, 9 and 10.

Further, 20 parts by weight of a short nylon fiber was incorporated in the rubber formulations shown in Tables 3, 4, 5 and 10, and power transmission belts constituted of an adhesive rubber layer 13 with core wires 12 embedded therein, a bottom rubber layer 15 having ribs 14 as adhered to one face of said adhesive rubber layer 13 and a coat canvas 11 adhered to the other face of said adhesive rubber layer 13, as shown in FIG. 1, were molded in the conventional manner under the vulcanization conditions given in Tables 7, 8, 9 and 10. The unvulcanized raw rubbers (raw material rubbers), unvulcanized compounded rubbers, obtained vulcanized rubber sheets and power transmission belts were evaluated from the viewpoints mentioned below.

TABLE 2

| Rubber (designation) | Elastomer used |
|---|---|
| Natural rubber (NR) | RSS#3 |
| Nitrile rubber (NBR) | Nippon Zeon Nipol 1042 (trade mark) |
| Styrene-butadiene rubber (SBR) | Nippon Zeon Nipol 1502 (trade mark) |
| Ethylene-propyrene rubber (ER) | JSR EP43 (trade mark) |
| Epichlorohydrin rubber (ECO) | Nippon Zeon Gechran 2000 (trade mark) |
| Acrylic rubber (ACM) | Nippon Zeon Nipal AR72LF (trade mark) |
| Ethylene-acrylic rubber (EA) | DDE Japan Baymac G (trade mark) |
| Chloroprene rubber (G1) | Showa DDE manufacturing Neoprene GS (trade mark) |
| Chloroprene rubber (G2) | Showa DDE manufacturing Neoprene GRT (trade mark) |
| Chloroprene rubber (B32) | Trial polymer |
| Chloroprene rubber (B33) | Trial polymer |
| Chloroprene rubber (B44) | Trial polymer |
| Chloroprene rubber (B44) | Trial polymer |
| Chloroprene rubber (B44) | Trial polymer |
| Chloroprene rubber (B49) | Trial polymer |
| Chloroprene rubber (B72) | Trial polymer |
| Chloroprene rubber (B73) | Trial polymer |

TABLE 3

| Rubber species (designation) | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Component | | | | | | | | | | | | | | | | |
| Nitrile rubber (NR) | 100 | — | — | — | — | — | — | — | — | — | — | — | — | — | — | — |
| styrene-butadiene rubber (SBR) | — | 100 | — | — | — | — | — | — | — | — | — | — | — | — | — | — |
| Etylene-propylene rubber (EP) | — | — | 100 | — | — | — | — | — | — | — | — | — | — | — | — | — |
| Chloroprene rubber (G1) | — | — | — | — | — | — | — | — | — | — | — | 100 | 100 | 100 | 100 | 100 |
| Chloroprene rubber (G2) | — | — | — | — | — | — | — | — | — | — | — | — | — | — | — | — |
| Chloroprene rubber (B32) | — | — | — | 100 | — | — | — | — | — | — | — | — | — | — | — | — |
| Chlaroprene rubber (B33) | — | — | — | — | 100 | — | — | — | — | — | — | — | — | — | — | — |
| Chloroprene rubber (B44) | — | — | — | — | — | 100 | — | — | — | — | — | — | — | — | — | — |
| Chloroprene rubber (B47) | — | — | — | — | — | — | 100 | — | — | — | — | — | — | — | — | — |
| Chloroprene rubber (B48) | — | — | — | — | — | — | — | 100 | — | — | — | — | — | — | — | — |
| Chloroprene rubber (B49) | — | — | — | — | — | — | — | — | 100 | — | — | — | — | — | — | — |
| Chloroprene rubber (B72) | — | — | — | — | — | — | — | — | — | 100 | — | — | — | — | — | — |
| Chloroprene rubber (B73) | — | — | — | — | — | — | — | — | — | — | 100 | — | — | — | — | — |
| HAF carbon | 40 | 60 | 50 | 40 | 40 | 40 | 40 | 40 | 40 | 40 | 40 | 40 | 40 | 40 | 40 | 40 |
| Plasticizer DOS | — | — | — | 8 | 8 | 8 | 8 | 8 | 8 | 8 | 8 | 8 | 8 | 8 | 8 | 8 |
| Stearic acid | 1 | 1 | 1 | 1 | 1 | 1 | 1 | 1 | 1 | 1 | 1 | 1 | 1 | 1 | 1 | 1 |
| Zinc oxide | 5 | 5 | 3 | 5 | 5 | 5 | 5 | 5 | 5 | 5 | 5 | 5 | 5 | 5 | 5 | 5 |
| Magnesium oxide | — | — | — | 4 | 4 | 4 | 4 | 4 | 4 | 4 | 4 | 4 | 4 | 4 | 4 | 4 |
| Hard cray | — | — | — | — | — | — | — | — | — | — | — | 10 | 20 | 30 | — | — |
| Calcium carbonate | — | — | — | — | — | — | — | — | — | — | — | — | — | — | 10 | 20 |
| Silica | — | — | — | — | — | — | — | — | — | — | — | — | — | — | — | — |
| Vulcanization accelerator OBS | — | 1 | — | — | — | — | — | — | — | — | — | — | — | — | — | — |
| Vulcanization accelerator TMTD | 1.5 | — | 1 | — | — | — | — | — | — | — | — | — | — | — | — | — |
| Vulcanization accelerator OBS | 1.5 | — | — | — | — | — | — | — | — | — | — | — | — | — | — | — |
| Sulfur | 0.5 | 1.75 | 1.75 | — | — | — | — | — | — | — | — | — | — | — | — | — |
| Trimethylthiourea | — | — | — | — | — | — | — | — | — | — | — | — | — | — | — | — |

| Rubber species (designation) | Example | | | |
|---|---|---|---|---|
| | 17 | 18 | 19 | 20 |
| Component | | | | |
| Nitrile rubber (NR) | — | — | — | — |
| styrene-butadiene rubber (SBR) | — | — | — | — |
| Etylene-propylene rubber (EP) | — | — | — | — |
| Chloroprene rubber (G1) | 100 | 100 | 100 | 100 |
| Chloroprene rubber (G2) | — | — | — | — |
| Chloroprene rubber (B32) | — | — | — | — |
| Chlaroprene rubber (B33) | — | — | — | — |
| Chloroprene rubber (B44) | — | — | — | — |
| Chloroprene rubber (B47) | — | — | — | — |
| Chloroprene rubber (B48) | — | — | — | — |
| Chloroprene rubber (B49) | — | — | — | — |
| Chloroprene rubber (B72) | — | — | — | — |
| Chloroprene rubber (B73) | — | — | — | — |

TABLE 3-continued

| | | | | |
|---|---|---|---|---|
| HAF carbon | 40 | 40 | 40 | 40 |
| Plasticizer DOS | 8 | 8 | 8 | 8 |
| Stearic acid | 1 | 1 | 1 | 1 |
| Zinc oxide | 5 | 5 | 5 | 5 |
| Magnesium oxide | 4 | 4 | 4 | 4 |
| Hard cray | — | — | — | — |
| Calcium carbonate | 30 | — | — | — |
| Silica | — | 10 | 20 | 30 |
| Vulcanization accelerator OBS | — | — | — | — |
| Vulcanization accelerator TMTD | — | — | — | — |
| Vulcanization accelerator OBS | — | — | — | — |
| Sulfur | — | — | — | — |
| Trimethylthiourea | — | — | — | — |

TABLE 4

| Rubber species (designation) | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|
| Component | | | | | | | | | | | | | | | | | |
| Nitrile rubber (NR) | — | — | — | — | — | — | — | — | — | — | — | — | — | — | — | — | — |
| styrene-butadiene rubber (SBR) | — | — | — | — | — | — | — | — | — | — | — | — | — | — | — | — | — |
| Etylene-propylene rubber (EP) | — | — | — | — | — | — | — | — | — | — | — | — | — | — | — | — | — |
| Chloroprene rubber (G1) | 100 | 100 | 100 | 100 | 100 | 100 | — | — | — | 100 | 100 | 100 | 100 | 100 | 100 | 100 | 100 |
| Chloroprene rubber (G2) | — | — | — | — | — | — | — | — | — | — | — | — | — | — | — | — | — |
| Chloroprene rubber (B32) | — | — | — | — | — | — | — | — | — | — | — | — | — | — | — | — | — |
| Chlaroprene rubber (B33) | — | — | — | — | — | — | — | — | — | — | — | — | — | — | — | — | — |
| Chloroprene rubber (B44) | — | — | — | — | — | — | — | — | — | — | — | — | — | — | — | — | — |
| Chloroprene rubber (B47) | — | — | — | — | — | — | — | — | — | — | — | — | — | — | — | — | — |
| Chloroprene rubber (B48) | — | — | — | — | — | — | — | — | — | — | — | — | — | — | — | — | — |
| Chloroprene rubber (B49) | — | — | — | — | — | — | — | — | — | — | — | — | — | — | — | — | — |
| Chloroprene rubber (B72) | — | — | — | — | — | — | — | — | — | — | — | — | — | — | — | — | — |
| Chloroprene rubber (B73) | — | — | — | — | — | — | 100 | 100 | 100 | — | — | — | — | — | — | — | — |
| HAF carbon | 40 | 40 | 40 | 40 | 40 | 40 | 40 | 40 | 40 | 60 | 40 | 40 | 40 | 40 | 40 | 40 | 40 |
| Plasticizer DOS | 8 | 8 | 8 | 8 | 8 | 8 | 8 | 8 | 8 | 8 | 8 | 8 | 8 | 8 | 8 | 8 | 8 |
| Stearic acid | 1 | 1 | 1 | 1 | 1 | 1 | 1 | 1 | 1 | 1 | 1 | 1 | 1 | 1 | 1 | 1 | 1 |
| Zinc oxide | — | 1 | 3 | 4 | 5 | 1 | 1 | 5 | 1 | 5 | 5 | 5 | 5 | 6 | 8 | 9 | — |
| Magnesium oxide | 9 | 8 | 6 | 7 | 9 | 8 | 8 | 4 | 8 | 4 | 4 | 4 | 4 | 3 | 1 | — | 9 |
| Hard cray | — | — | — | — | — | — | — | — | — | — | 40 | — | — | — | — | — | — |
| Calcium carbonate | — | — | — | — | — | 20 | — | 20 | 20 | — | — | 40 | — | — | — | — | — |
| Silica | — | — | — | — | — | — | — | — | — | — | — | — | 40 | — | — | — | — |
| Vulcanization accelerator OBS | — | — | — | — | — | — | — | — | — | — | — | — | — | — | — | — | — |
| Vulcanization accelerator TMTD | — | — | — | — | — | — | — | — | — | — | — | — | — | — | — | — | — |
| Vulcanization accelerator OBS | — | — | — | — | — | — | — | — | — | — | — | — | — | — | — | — | — |
| Sulfur | — | — | — | — | — | — | — | — | — | — | — | — | — | — | — | — | — |
| Trimethylthiourea | 0.5 | 0.5 | 0.5 | 0.5 | 0.5 | 0.5 | 0.5 | — | 0.5 | — | — | — | — | 0.5 | 0.5 | 0.5 | 0.5 |

TABLE 5

| | Comparative Ex. | | |
|---|---|---|---|
| Components | 1 | 2 | 3 |
| Natural rubber (NR) | 100 | — | — |
| Chloroprene rubber (G1) | — | 100 | — |
| Chloroprene rubber (G2) | — | — | 100 |
| HAF carbon | 60 | 40 | 40 |
| Plasticizer DOS | — | 8 | 8 |
| Stearic acid | 1 | 1 | 1 |
| Zinc oxide | 5 | 5 | 5 |
| Magnesium oxide | — | 4 | 4 |
| Hard cray | — | — | — |
| Calcium carbonate | — | — | — |
| Silica | — | — | — |
| Vulcanization accelerator OBS | 0.8 | — | — |
| Sulfur | 2.5 | — | — |
| Trimethylthiourea | — | — | — |

In Tables 3, 4 and 5, the proportions of the components are given in parts by weight.

Methods of Evaluating Raw Material Rubbers (1) Viscoelasticity Testing

Using parallel plates having a diameter of 25 mm, the test was carried out in the shear mode in the linear strain range of 1.7 to 4% in an atmosphere maintained at 120° C., by vibrating said parallel plates at a frequency of 0.1 rad/s, and the loss modulus (G") and storage elastic modulus (G') were measured, followed by calculation of tan δ. The results thus obtained are shown in Tables 7, 8 and 9.

(2) Molecular Weight Determination by GPC

Figure 4:
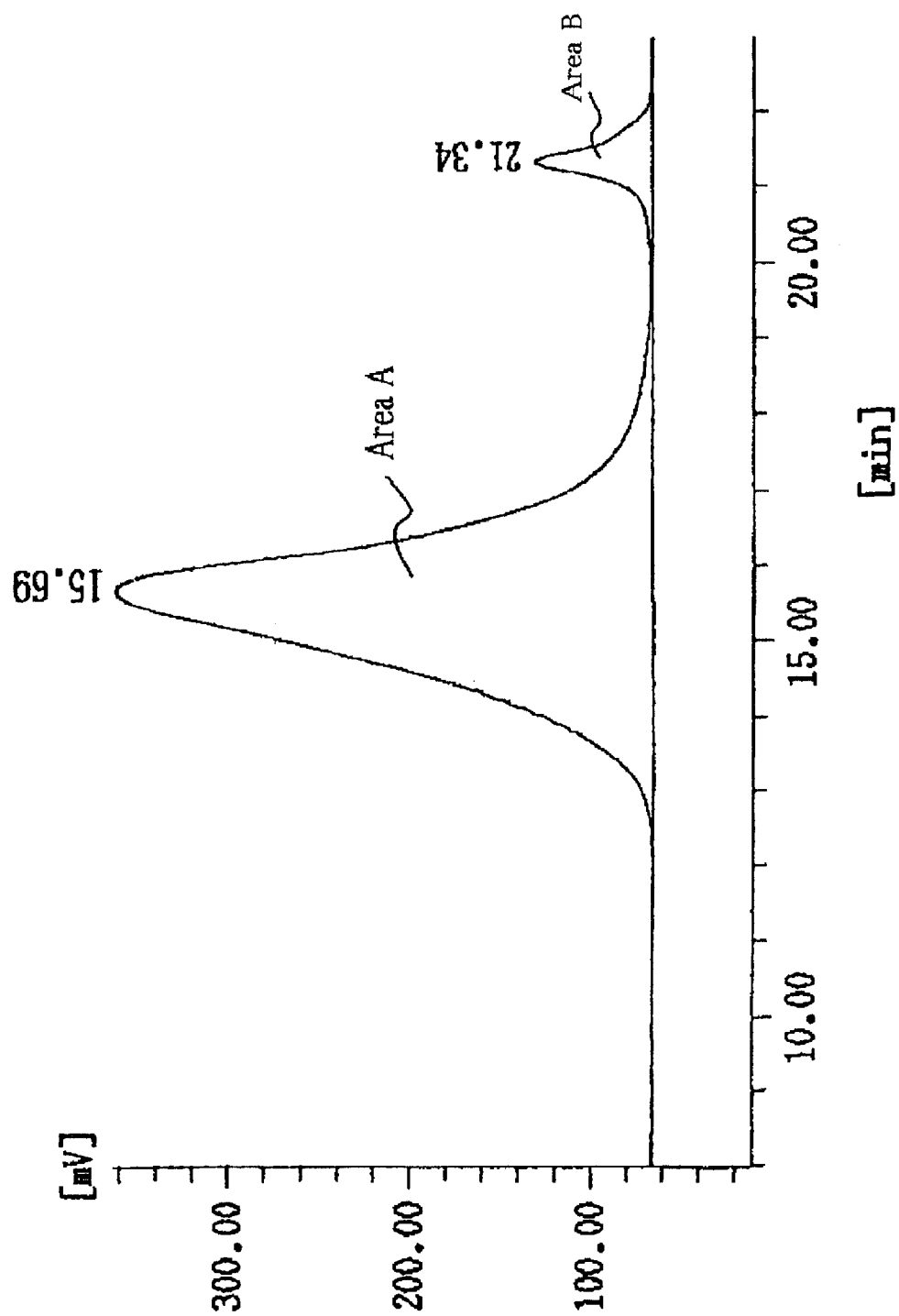
FIG. 4 is an example of the peak curve chart obtained by GPC analysis.

Samples for injection were prepared and the molecular weights determined under the conditions mentioned below. An example of the GPC peak curve obtained is shown in FIG. 4. As shown in FIG. 4, the GPC peak curve has two peaks, and the portion between them where the component amount is lowest corresponds to a polystyrene equivalent molecular weight of 2,500 with a retention time of 20 minutes. Therefore, for the peak shorter in retention time than 20 minutes and presumably corresponding to substantial high-molecular components (components with a polystyrene equivalent molecular weight of not less than 2,500), the number average molecular weight (Mn) was determined. The results thus obtained are shown in Tables 7, 8 and 9.

GPC apparatus: Tosoh HLC-8020;
Column: Tosoh GMXHR two columns;
Column temperature: 40° C.;
Mobile phase: THF (1 milliliter/min);
Detection: By means of refractive index;
Injection size: 100 microliters;
Standard sample: Monodisperse polystyrene.
Preparation of samples for injection: Each test specimen was dissolved in THF in a proportion of 1 milliliter of THF per about 3 mg of the test specimen, the solution was filtered through a 0.5-μu filter, and the filtrate was used as the sample for injection.

(3) Low-molecular Fraction W (%) Measurement by GPC

In the GPC peak curve (FIG. 4) obtained by the method mentioned above under (2), the peak portion with a retention time longer than 20minutes corresponds to low-molecular components with a polystyrene equivalent molecular weight less than 2,500. Therefore, the low molecular fraction W (%) was calculated from the area A of the peak corresponding to polystyrene equivalent molecular weights not less than 2,500 and the area B of the peak corresponding to polystyrene equivalent molecular weights not higher than 2,500, as follows:

$$W (\%) = [B/(A+B)] \times 100$$

The results thus obtained are shown in Tables 7, 8 and 9.

(4) Measurement of Free Stabilizer Content

Out of 10 pass stocks, exactly 2.00 grams each was weighed and placed in a 250-milliliter bottle for exclusive use, 150 milliliters of acetone for industrial use was added, the exclusive use bottle was shaken for 20 minutes, and the extracts were transferred to a 300-milliliter tall beaker, followed by titration with 1/30 N $Na_2S$. The end point of titration was the point of turning into a slightly greenish blue color.

The content (% by weight) of the free-state stabilizer as tetraethylthiuram disulfide was calculated as follows:

Free stabilizer content (% by weight)=[amount (ml) of $Na_2S$ titer]/ [sample weight (g)]×$F$×100

The results thus obtained are shown in Tables 7, 8 and 9.

In the above formula, F is the factor of the $Na_2S$ solution. This factor was determined beforehand by accurately weighing the stabilizer, dissolving in acetone for industrial use, titrating with the $Na_2S$ solution used in the above titration and calculating as follows:

$F$=[amount of stabilizer used]/[amount (milliliters) of $Na_2S$ solution]

Method of Evaluating Unvulcanized Compound Rubbers

The scorching time $t_{35}$ (ML, 125° C.) of each unvulcanized rubber composition was measured using a Mooney viscometer. The results thus obtained are shown in Tables 7, 8 and 9.

Methods of Evaluating Vulcanized Rubber Sheets (1) Taber's Abrasion Resistance Test The above vulcanized rubber sheets were subjected to Taber's abrasion resistance test. In each case, the procedure prescribed in JIS K 6264 was followed except for the following.

First, one of sand papers differing in particle size shown in Table 6 was sticked to a CS0 abrasive disk using a pressure sensitive adhesive double coated tape and the whole was used as the counter material in lieu of the abrasive disk.

In the above test, the load was 500 gf and the number of wear cycles (number of rotations) was 500, and no abrasion dust suction apparatus was used.

The most coarse C280 sand paper was first used for one test specimen and the abrasion loss (mg), namely the difference between the weight of the test specimen before testing and that after testing, was determined. Then, sand papers smaller in particle size were successively used each as the counter material against test specimens of the same lot and abrasion loss measurements were carried out.

Figure 3:
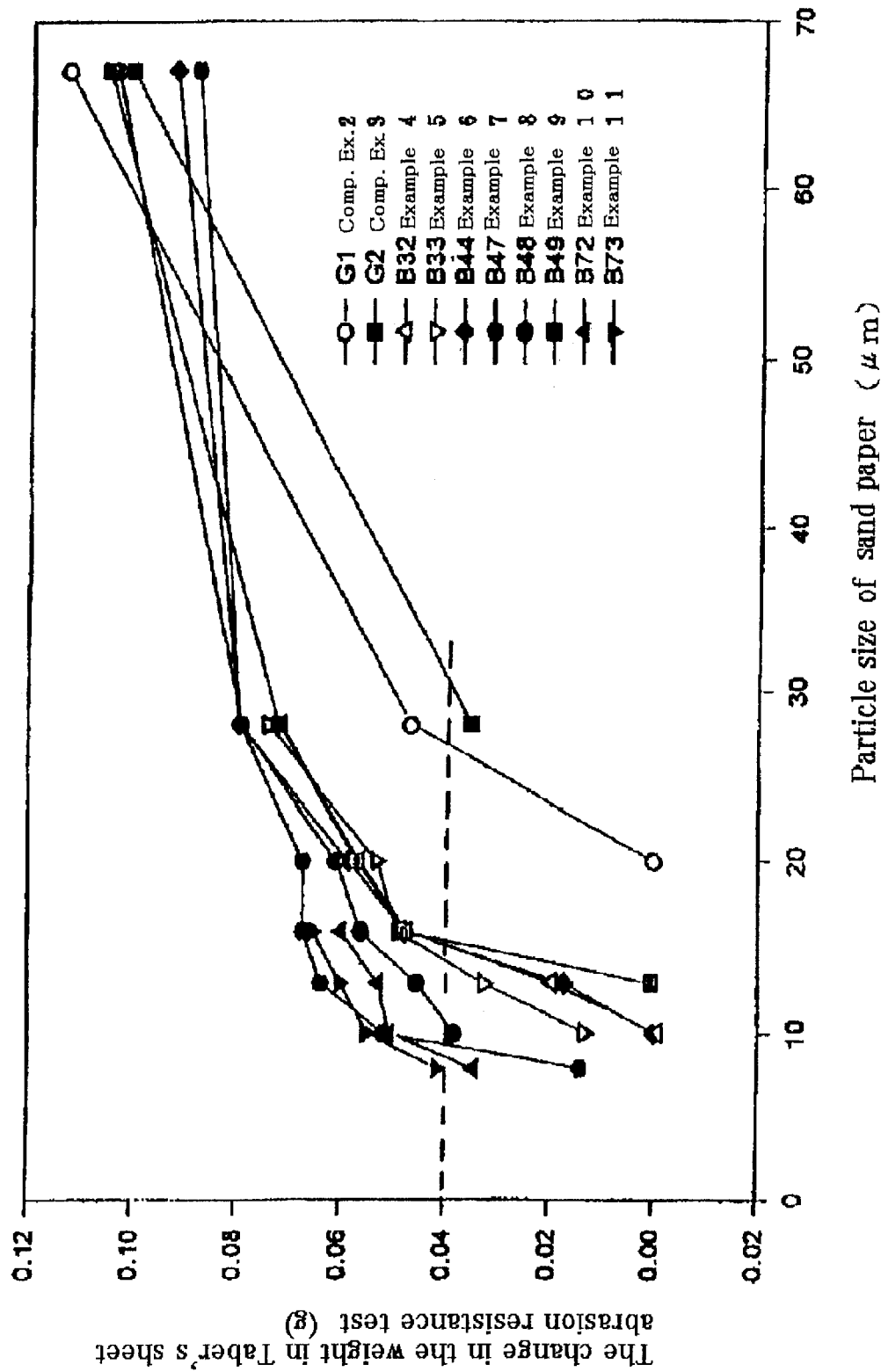
FIG. 3 is a graphic of the results of Taber's abrasion resistance test of sheets in the examples and comparative examples.

Then, for each lot of test specimens, the relationship between particle size of the sand paper and abrasion loss was plotted graphically and, on the graph obtained, the particle size of the sand paper corresponding to the abrasion loss of 40 mg was read. An example is shown in FIG. 3.

Employing, as an adhesiveness index, this particle size of the sand paper (μm) as read, and the results are summarized in Tables 7, 8, 9 and 10.

TABLE 6

| Sand paper species | C280 | C600 | C800 | C1000 | C1200 | C1500 | C2000 |
|---|---|---|---|---|---|---|---|
| Particle size (μm) | 67 | 28 | 20 | 16 | 13 | 10 | 7.9 |

(2) Rubber Hardness and Tensile Testing

Rubber hardness (JIS A) measurement and tensile testing were carried out according to JIS K 6301. The tensile product (MPa) was calculated as the product of the tensile strength (MPa) and elongation at break as determined by the tensile testing. In this calculation, MPa was used as the unit of tensile strength, and the strain at break (dimensionless) was used as the unit of elongation at break. The results thus obtained are shown in Tables 7, 8 and 9.

Methods of Evaluating Power Transmission Belts (1) Taber's Abrasion Resistance Test Power transmission belts made up in the form shown in FIG. 1 were subjected to Taber's abrasion resistance test in the manner mentioned above. On that occasion, the procedure prescribed in JIS K 6264 was followed except for the following.

First, a sand paper (C1500) having a particle size of 10 μm as sticked to a CS0 abrasive disk using a pressure sensitive adhesive double coated tape was used as the counter material in lieu of the abrasive disk. In Taber's abrasion resistance test of belts, a plurality of belt segments (10 cm in length) cut from each power transmission belt of the shape shown in FIG. 1 were placed side by side in the same direction to prepare a 10 cm×10 cm test specimen, and this specimen was used in the abrasion test of the bottom rubber layer elastomer composition. Since the belt surface of this test specimen was not smooth and had concave portions not contacting the counter material, the area Y ($cm^2$) which had actually contacted the counter material was measured after said test. In this test, the load was 500 gf, the number of wear cycles (number of rotations) was 500, and no abrasion dust suction mechanism was used. The abrasion loss X (mg) was calculated based on the difference between the test specimen weight before testing and that after testing, and then the ratio X/Y of said loss to said area Y ($cm^2$) was calculated. The results thus obtained are shown in Tables 7, 8 and 9.

(2) Belt Adhesiveness Test and Noise Measurement

Figure 2:
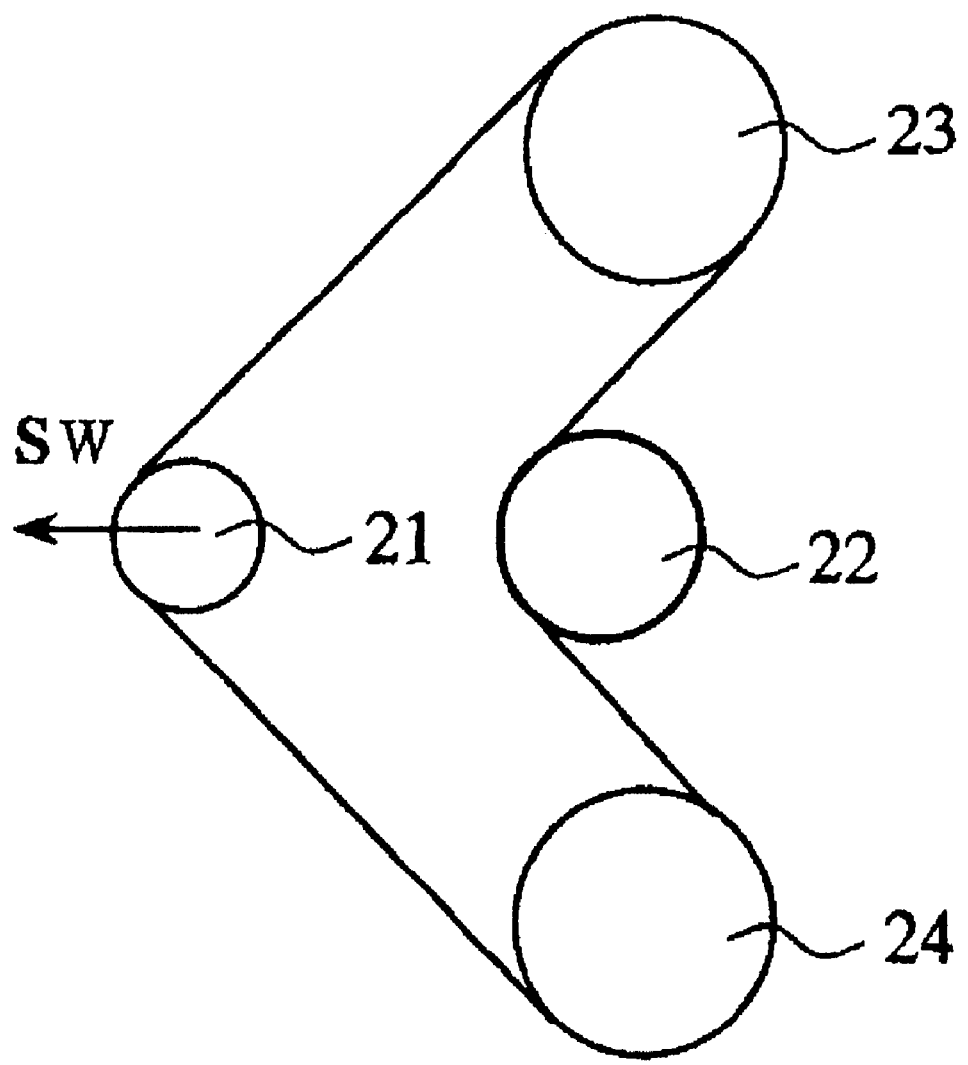
FIG. 2 is a schematic drawing of the apparatus used in carrying out the belt adhesiveness test in the examples and comparative examples for illustrating the present invention.

A test system of the shape shown in FIG. 2 was used. Each of the belts produced in the above examples and comparative examples was mounted on four pulleys 21, 22, 23 and 24, the belt was driven at room temperature for 2 hours in a state such that a load SW (set weight) of 20 kgf per a rib was applied to the pulley 21. The state of adhesion of abrasion dust was observed for evaluating the belt adhesiveness according to the criteria given below. The results thus obtained are shown in Tables 7, 8, 9 and 10. The pulley 21 had a diameter of 45 mm, the pulley 22 had a diameter of 75 mm, and the pulleys 23 and 24 had a diameter of 120 mm. The belt portions on both sides in each of the pulley 21 or 22 showed an angle of 90°. The pulley 23 was rotated at a speed of 4,900 rpm and a load of 2 kW per a rib was applied on the pulley 23. The pulleys 21, 22, 23 and 24 were all formed with S45C.

No adhesion: No abrasion dust is observed on the ribbed bottom of the belt.

Very slight adhesion: Very slight abrasion dust adhesion is observed on the ribbed bottom of the belt.

Slight adhesion: Adhesion of particulate abrasion dust is observed in several positions on the ribbed bottom of the belt.

Medium adhesion: Adhesion of streaks of conjoined abrasion dust powders is observed.

Marked adhesion: Streaks of conjoined abrasion dust particles are stuck in a laminar fashion and cover most of the ribbed bottom.

In the above test, at the time point after 30 minutes of belt running, noise measurement during belt running was performed by measuring the sound pressure at a frequency of 6,000 Hz.

Since the measured value varied depending on the sensor species and a slight difference in arrangement, a belt noise index was determined as the ratio of said value to the sound pressure measured with a standard belt (belt in which the elastomer composition of Comparative Example 2 (Table 5) was used as the constituent material), as defined below. The results thus obtained are shown in Tables 7, 8, 9 and 10.

(Belt noise index)=[sound pressure (dB) at a frequency of 6,000 Hz during running of the test belt]/[sound pressure (dB) at a frequency of 6,000 Hz during running of the standard belt]

As the above formula indicates, the sound level becomes higher as the belt noise index increases.

(3) Belt Durability Test

A belt running test was carried out using a layout as shown in FIG. 2.

The temperature of the atmosphere was 85° C., and the pulleys 21, 22, 23 and 24 were each formed with S45C. The pulley 21 had a diameter of 55 mm, the pulley 22 had a diameter of 70 mm, and the pulleys 23 and 24 had a diameter of 120 mm, and the belt portions on both sides of the pulley 21 or 22 showed an angle of 90°. The pulley 23 was rotated at a speed of 4,900 rpm and a load of 2 kW per a rib was applied to the pulley 23. The belt was run in a state such that a load of 28.3 kgf per a rib was applied, as a set weight, to the pulley 21.

The durability of the belt was evaluated in terms of hours from the start of running to crack formation on the rib face. The results thus obtained are shown in Tables 7, 8 and 9.

TABLE 7

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Raw rubber characteristics | | | | | | | | | | | | | | |
| Loss tangent tan δ | | | | 1.25 | 1.02 | 1.22 | 1.02 | 0.98 | 2.4 | 0.36 | 0.47 | | | |
| Mn (× $10^4$) | | | | 5.99 | 6.3 | 8.24 | 4.48 | 4.75 | 4.87 | 8.08 | 5.58 | | | |
| tan δ × $(Mn)^3$ (× $10^{14}$) | | | | 2.69 | 2.56 | 2.96 | 0.92 | 1.04 | 2.78 | 0.82 | 0.8 | | | |
| Low-molecular fraction W (%) | | | | 5.8 | 7 | 3.2 | 2.4 | 2.4 | 4 | 2 | 2.4 | | | |

TABLE 7-continued

| | | | | | | | | | | | | | | |
|---|---|---|---|---|---|---|---|---|---|---|---|---|---|---|
| Free plasticizer (% by weight) | | | | 1.4 | 1.4 | 0.9 | 0.9 | 1.4 | 1.8 | 0.9 | 0.5 | | | |
| Compounded rubber characteristics | | | | | | | | | | | | | | |
| Mooney scorch time $t_{35}$ (ML 125° C., (min.)) | | | | | | | | | | | | | | |
| Vulcanization condition | | | | | | | | | | | | | | |
| Vulcanization temperature (° C.) | 160 | 140 | 160 | 150 | 150 | 150 | 150 | 150 | 150 | 150 | 150 | 150 | 150 | 150 |
| Vulcanization time (min.) | 20 | 30 | 30 | 30 | 30 | 30 | 30 | 30 | 30 | 30 | 30 | 30 | 30 | 30 |
| Sheet rubber characteristics | | | | | | | | | | | | | | |
| Adhesive index (μm) in Taber's sheet abrasion resistance test | 16.2 | 15.3 | 16.6 | 15.2 | 14.3 | 15.2 | 9.3 | 10.7 | 15.5 | 8.6 | 7.8 | 15.5 | 14.5 | 9.5 |
| Rubber hardness (JIS A) | | | | | | | | | | | | 69 | 71 | 73 |
| Tensile strength (MPa) | | | | | | | | | | | | 20 | 19 | 17 |
| Elongation at break (%) | | | | | | | | | | | | 450 | 420 | 400 |
| Tencile product (MPa) | | | | | | | | | | | | 90 | 80 | 68 |
| Belt characteristics | | | | | | | | | | | | | | |
| X/Y (mg/cm²) in Taber's sheet abrasion resistance test | 2.6 | 2.7 | 2.7 | 2.7 | 3 | 2.9 | 3.4 | 3.5 | 2.7 | 3.9 | 4.1 | 2.7 | 3 | 3.4 |
| Belt Adhesiveness | medium | medium | medium | slight | slight | medium | slight | slight | medium | very slight | very slight | medium | slight | slight |
| Belt noise index | 0.8 | 0.8 | 0.8 | 0.7 | 0.7 | 0.8 | 0.7 | 0.7 | 0.8 | 0.5 | 0.5 | 0.8 | 0.6 | 0.6 |
| Belt durability time (hrs) | | | | | | | | | | | | 220 | 210 | 200 |

| | Example | | | | | |
|---|---|---|---|---|---|---|
| | 15 | 16 | 17 | 18 | 19 | 20 |
| Raw rubber characteristics | | | | | | |
| Loss tangent tan δ | | | | | | |
| Mn (× 10⁻⁴) | | | | | | |
| tan δ × (Mn)³ (× 10¹⁴) | | | | | | |
| Low-molecular fraction W (%) | | | | | | |
| Free plasticizer (% by weight) | | | | | | |
| Compounded rubber characteristics | | | | | | |
| Mooney scorch time $t_{35}$ (ML 125° C., (min.)) | | | | | | |
| Vulcanization condition | | | | | | |
| Vulcanization temperature (° C.) | 150 | 150 | 150 | 150 | 150 | 150 |
| Vulcanization time (min.) | 30 | 30 | 30 | 30 | 30 | 30 |
| Sheet rubber characteristics | | | | | | |
| Adhesive index (μm) in Taber's sheet abrasion resistance test | 15.8 | 10.9 | 8 | 15.1 | 13.5 | 10.1 |
| Rubber hardness (JIS A) | 69 | 71 | 73 | 72 | 73 | 82 |
| Tensile strength (MPa) | 20 | 19 | 17 | 20 | 20 | 21 |
| Elongation at break (%) | 430 | 410 | 390 | 380 | 310 | 260 |
| Tencile product (MPa) | 86 | 78 | 66 | 76 | 62 | 55 |
| Belt characteristics | | | | | | |
| X/Y (mg/cm²) in Taber's sheet abrasion resistance test | 2.9 | 3.5 | 3.9 | 2.7 | 3.1 | 3.6 |
| Belt Adhesiveness | medium | slight | very slight | medium | slight | slight |
| Belt noise index | 0.8 | 0.7 | 0.5 | 0.8 | 0.6 | 0.7 |
| Belt durability time (hrs) | 210 | 200 | 190 | 190 | 180 | 160 |

TABLE 8

|  | Example | | | | | | | | | | | |
|---|---|---|---|---|---|---|---|---|---|---|---|---|
|  | 21 | 22 | 23 | 24 | 25 | 26 | 27 | 28 | 29 | 30 | 31 | 32 |
| Raw rubber characteristics | | | | | | | | | | | | |
| Loss tangent tan δ | | | | | | | | | | | | |
| Mn (× $10^4$) | | | | | | | | | | | | |
| tan δ × (Mn)$^3$ (× $10^{14}$) | | | | | | | | | | | | |
| Low-molecular fraction W (%) | | | | | | | | | | | | |
| Free plasticizer (% by weight) | | | | | | | | | | | | |
| Compounded rubber characteristics | | | | | | | | | | | | |
| Mooney scorch time $t_{35}$ (ML 125° C., (min.)) | 32 | 24 | 15 | 14 | 13 | 24 | 24 |  | 24 |  |  |  |
| Vulcanization condition | | | | | | | | | | | | |
| Vulcanization temperature (° C.) | 150 | 150 | 150 | 150 | 150 | 150 | 150 | 150 | 150 | 150 | 150 | 150 |
| Vulcanization time (min.) | 30 | 30 | 30 | 30 | 30 | 30 | 30 | 30 | 30 | 30 | 30 | 30 |
| Sheet rubber characteristics | | | | | | | | | | | | |
| Adhesive index (μm) in Taber's sheet abrasion resistance test | 15.6 | 15.3 | 15.7 | 15.1 | 16 | 9 | 7.8 | 7.8 | 7.8 | 7.5 | 10.3 | 8.1 |
| Rubber hardness (JIS A) | 70 | 70 | 70 | 70 | 70 | 72 | 70 | 71 | 73 | 80 | 75 | 75 |
| Tensile strength (MPa) | 20 | 20 | 21 | 22 | 21 | 20 | 20 | 19 | 20 | 25 | 13 | 12 |
| Elongation at break (%) | 410 | 410 | 400 | 420 | 410 | 400 | 410 | 410 | 380 | 180 | 330 | 320 |
| Tencile product (MPa) | 82 | 82 | 84 | 92 | 86 | 80 | 82 | 78 | 72 | 45 | 43 | 38 |
| Belt characteristics | | | | | | | | | | | | |
| X/Y (mg/cm$^2$) in Taber's sheet abrasion resistance test | 2.9 | 3 | 2.9 | 3.1 | 3 | 3.7 | 4.2 | 4.3 | 4.5 | 4.1 | 3.6 | 4 |
| Belt Adhesiveness | medium | medium | medium | slight | medium | very slight | very slight | none | none | very slight | very slight | very slight |
| Belt noise index | 0.7 | 0.7 | 0.8 | 0.7 | 0.8 | 0.5 | 0.4 | 0.3 | 0.2 | 0.5 | 0.4 | 0.5 |
| Belt durability time (hrs) | 180 | 180 | 180 | 180 | 180 | 180 | 180 | 170 | 160 | 140 | 140 | 130 |

|  | Example | | | | |
|---|---|---|---|---|---|
|  | 33 | 34 | 35 | 36 | 37 |
| Raw rubber characteristics | | | | | |
| Loss tangent tan δ | | | | | |
| Mn (× $10^4$) | | | | | |
| tan δ × (Mn)$^3$ (× $10^{14}$) | | | | | |
| Low-molecular fraction W (%) | | | | | |
| Free plasticizer (% by weight) | | | | | |
| Compounded rubber characteristics | | | | | |
| Mooney scorch time $t_{35}$ (ML 125° C., (min.)) |  | 6 | 2 | 1 | 15 |
| Vulcanization condition | | | | | |
| Vulcanization temperature (° C.) | 150 | 150 | 150 | 150 | 150 |
| Vulcanization time (min.) | 30 | 30 | 30 | 30 | 30 |
| Sheet rubber characteristics | | | | | |
| Adhesive index (μm) in Taber's sheet abrasion resistance test | 9 | 17 | 15.8 | 15.9 | 9.3 |
| Rubber hardness (JIS A) | 87 | 70 | 70 | 70 | 85 |
| Tensile strength (MPa) | 22 | 20 | 20 | 21 | 20 |
| Elongation at break (%) | 200 | 400 | 420 | 410 | 240 |
| Tencile product (MPa) | 44 | 80 | 84 | 86 | 48 |
| Belt characteristics | | | | | |
| X/Y (mg/cm$^2$) in Taber's sheet abrasion resistance test | 3.8 | 2.9 | 2.9 | 2.9 | 4.1 |

TABLE 8-continued

|  |  |  |  |  |  |
|---|---|---|---|---|---|
| Belt Adhesiveness | very slight | medium | medium | medium | very slight |
| Belt noise index | 0.5 | 0.8 | 0.8 | 0.7 | 0.5 |
| Belt durability time (hrs) | 140 | 180 | 180 | 180 | 100 |

TABLE 9

|  | Comparative Ex. | | |
|---|---|---|---|
|  | 1 | 2 | 3 |
| Raw rubber characteristics | | | |
| Loss tangent tan δ |  | 0.95 | 1.05 |
| Mn (× 10$^4$) |  | 7.95 | 8.19 |
| tan δ × (Mn)$^3$ (× 10$^{14}$) |  | 4.76 | 5.78 |
| Low-molecular fraction W (%) |  | 6.6 | 7 |
| Free plasticizer (% by weight) |  | 1.4 | 1.4 |
| Compounded rubber characteristics | | | |
| Mooney scorch time t$_{35}$ (ML 125° C., (min.)) |  | 12 |  |
| Vulcanization condition | | | |
| Vulcanization temperature (° C.) | 150 | 150 | 150 |
| Vulcanization time (min.) | 30 | 30 | 30 |

TABLE 9-continued

|  | Comparative Ex. | | |
|---|---|---|---|
|  | 1 | 2 | 3 |
| Sheet rubber characteristics | | | |
| Adhesive index (μm) in Taber's sheet abrasion resistance test | 35 | 26.8 | 30.8 |
| Rubber hardness (JIS A) |  | 67 |  |
| Tensile strength (MPa) |  | 21 |  |
| Elongation at break (%) |  | 450 |  |
| Tencile product (MPa) |  | 95 |  |
| Belt characteristics | | | |
| X/Y (mg/cm$^2$) in Taber's sheet abrasion resistance test | 1 | 2.4 | 2.2 |
| Belt Adhesiveness | marked | marked | marked |
| Belt noise index | 1 | 1 | 1 |
| Belt durability time (hrs) |  | 230 |  |

TABLE 10

|  | Example | | | | Comparative Ex. | | | |
|---|---|---|---|---|---|---|---|---|
|  | 38 | 39 | 40 | 41 | 1 | 4 | 5 | 6 |
| Components | | | | | | | | |
| Natural rubber (NR) | 100 | — | — | — | 100 | — | — | — |
| Epichorohydrin rubber (ECO) | — | 100 | — | — | — | 100 | — | — |
| Acrylic rubber (ACM) | — | — | 100 | — | — | — | 100 | — |
| Ethylene-acrylic rubber (EA) | — | — | — | 100 | — | — | — | 100 |
| HAF carbon | 60 | 40 | 60 | 60 | 60 | 40 | 60 | 60 |
| Plasticizer DOS | — | — | — | 10 | — | — | — | 10 |
| Stearic acid | 1 | — | 1 | 2 | 1 | — | 1 | 2 |
| Zinc oxide | 5 | — | — | — | 5 | — | — | — |
| Magnesium oxide | — | 3 | — | — | — | 3 | — | — |
| Calcium carbonate | 30 | 30 | 30 | 30 | — | — | — | — |
| Vulcanization accelerator OBS | 0.8 | — | — | — | 0.8 | — | — | — |
| Sulfur | 2.5 | — | — | — | 2.5 | — | — | — |
| N-(cyclohexyltio)phthalimide | — | 1 | 0.2 | — | — | 1 | 0.2 | — |
| 2,4,6-trimercapto-s-triazine | — | 0.9 | — | — | — | 0.9 | — | — |
| Vulcanization accelerator ZnBDC | — | — | 1.5 | — | — | — | 1.5 | — |
| Vulcanization accelerator F | — | — | 0.5 | — | — | — | 0.5 | — |
| Vulcanization accelerator DEU | — | — | 0.3 | — | — | — | 0.3 | — |
| Diphenylguanidine | — | — | — | 4 | — | — | — | 4 |
| Hexamethylenediamine carbamate | — | — | — | 1.25 | — | — | — | 1.25 |
| Vulcanization conditions | | | | | | | | |
| Primary vulcanization temperature (° C.) | 150 | 170 | 170 | 177 | 150 | 170 | 170 | 177 |
| Primary vulcanization time (min) | 30 | 20 | 20 | 30 | 30 | 20 | 20 | 30 |
| Secondary vulcanization temperature (° C.) | — | 150 | 170 | 177 | — | 150 | 170 | 177 |
| Secondary vulcanization time (hrs.) | 0 | 4 | 4 | 4 | 0 | 4 | 4 | 4 |
| Sheet rubber characteristics | | | | | | | | |
| Adhesiveness index (μm) in Taber's sheet abrasion resistance test | 15 | 18 | 18 | 18 | 35 | 59 | 55 | 61 |
| Belt characteristics | | | | | | | | |
| Belt adhesiveness | medium | medium | medium | marked | marked | marked | marked | marked |
| Belt noise index | 0.8 | 0.8 | 0.8 | 0.8 | 1 | 1 | 1 | 1 |

In Table 10, the proportions of components are given in parts by weight.

Figure 5:
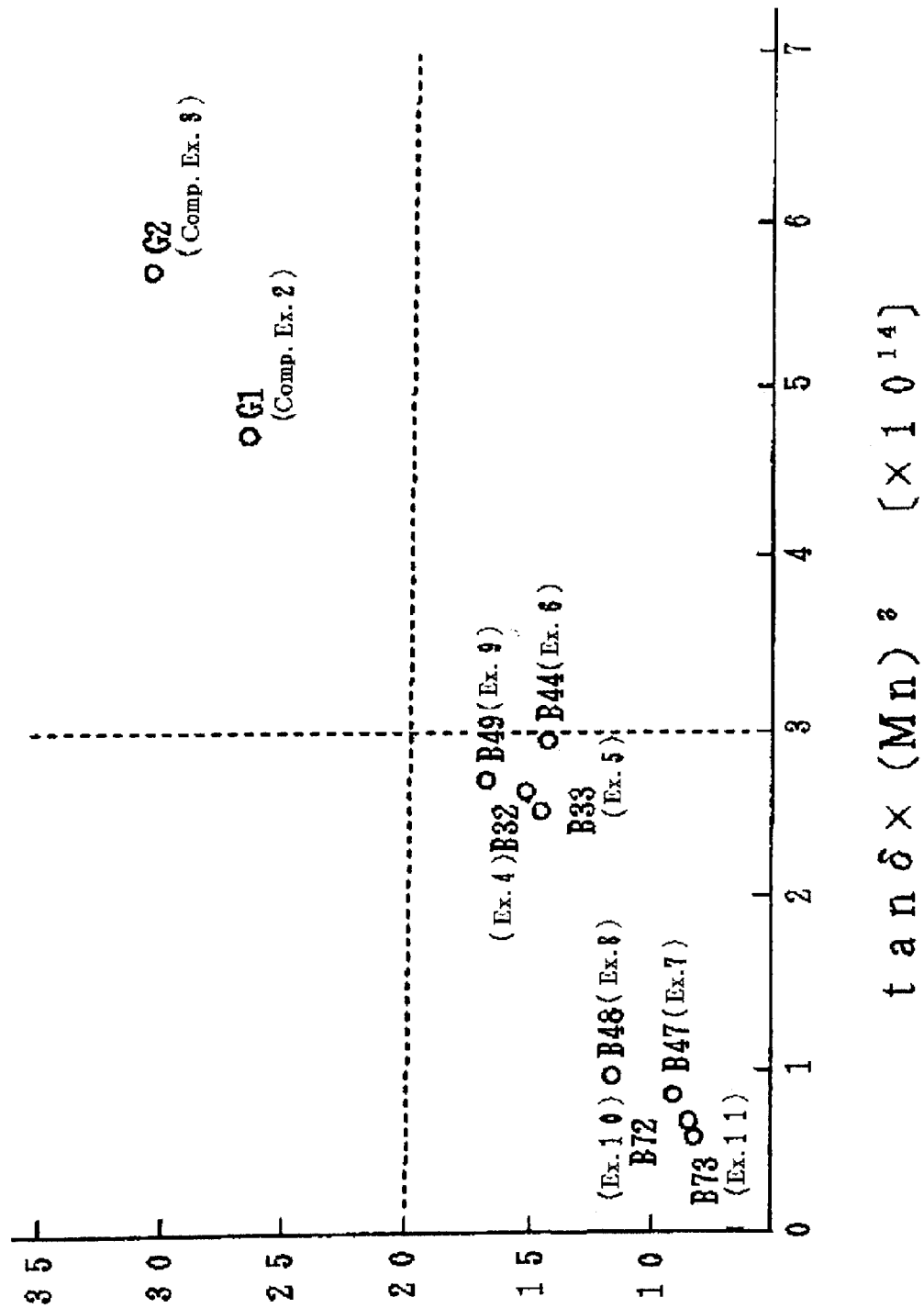
FIG. 5 is a graphic of the relationship between the product of tan δ and the cube of the number average molecular weight $(Mn)^3$ and the result of Taber's sheet abrasion resistance test.
Figure 6:
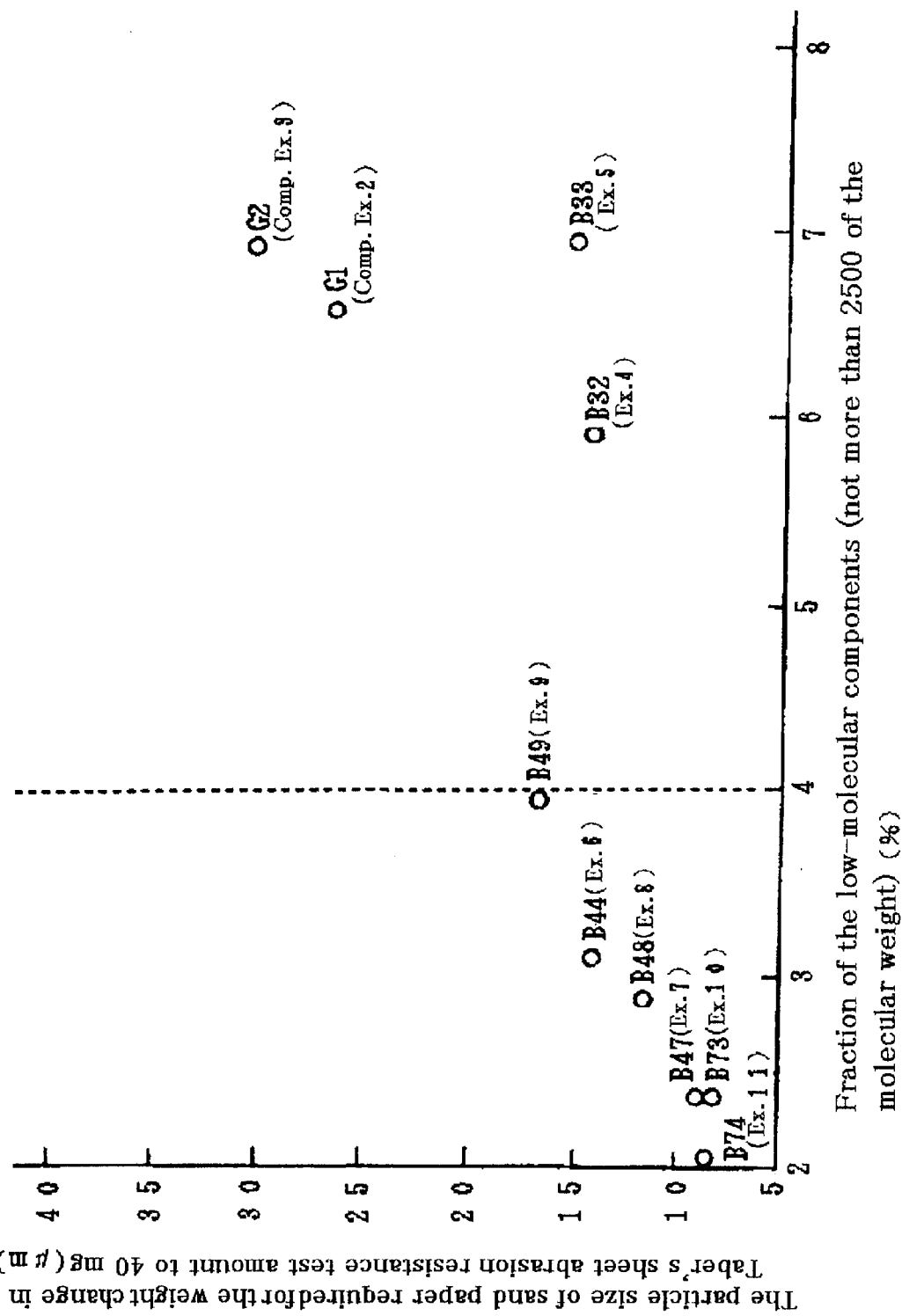
FIG. 6 is a graphic of the relationship between the low-molecular component fraction in the THF-soluble components and the result of Taber's sheet abrasion resistance test.

FIG. 3 graphically shows the relationship between the particle size of the sand paper used and the change in sheet weight as obtained in Taber's sheet abrasion resistance test. FIG. 5 graphically shows the relationship between the value tan $\delta \times (Mn)^3$ calculated from the loss tangent (tan $\delta$) obtained by viscoelasticity measurement and the number average molecular weight of those high-molecular components which have a polystyrene equivalent molecular weight of not less than 2,500 as found by GPC, on one hand, and, on the other, the particle size of the sand paper ($\mu$m) required for the weight change in Taber's sheet abrasion resistance test to amount to 40 mg. FIG. 6 graphically shows the relationship between the fraction of the above-mentioned low-molecular components and the particle size of the sand paper ($\mu$m) required for the weight change in Taber's sheet abrasion resistance test to amount to 40 mg.

(1) Results of Taber's Belt Abrasion Resistance Test

As is evident from the results of Taber's belt abrasion resistance test shown in Tables 7 and 9, the belts of Examples 1 to 11 gave X/Y values not lower than 2.5, while those of Comparative Examples 1 to 3 gave X/Y values lower than 2.5. As is evident from the results of belt adhesiveness testing shown in Tables 7 and 9, those of Examples 1 toll which gave X/Y values not lower than 2.5 showed medium or less adhesiveness and suppressed occurrence of adhesion wear, while those of Comparative Examples 1 to 3 which gave X/Y values lower than 2.5 each showed intense adhesiveness.

In Examples 10 and 11, where a chloroprene rubber was used, the X/Y values were high, namely 3.9 and 4.1, respectively and the belt adhesiveness was minimal; the effects were thus found especially significant. Further, from Table 7, it was found that when the belt adhesiveness is slight, the belt noise index is small, hence the emission of abnormal sounds during belt running can be suppressed.

(2) Results of Taber's Sheet Abrasion Resistance Test

As is evident from the results of Taber's sheet abrasion resistance test shown in Tables 5, 7 and 9, the measured results of those rubber sheets of Examples 1 to 11 which showed suppressed adhesion of abrasion dust to the belt each indicates that the counter material particle size of the sand paper (adhesiveness index) required for the weight change to amount to 40 mg is not more than 20 $\mu$m, while the measured results of those rubber sheets of Comparative Examples 1 to 3 which showed intense adhesion of abrasion dust to the belt each indicates that the counter material particle size of the sand paper (adhesiveness index) required for the weight change to amount to 40 mg is greater than 20 $\mu$m.

(3) Tensile Product of Rubber Sheet and Belt Durability

As is evident from Tables 7 and 8, the adhesiveness index in Taber's sheet abrasion resistance test was not more than 20 $\mu$m and the belt adhesiveness was medium or less, hence the adhesion wear was difficult to occur, in each of Examples 12 to 20 and Examples 30 to 33. In each of Examples 12 to 20, however, the belt durability time was not shorter than 150 hours while, in Examples 30 to 30, it was shorter than 150 hours. Upon comparison of the tensile products in Examples 12 to 20 with those in Examples 30 to 33, it was found that the tensile product was not less than 50 MPa in Examples 12 to 20 while it was not more than 50 MPa in Examples 30 to 33. Therefore, it was found that, for simultaneously attaining the adhesion wear preventing effect and belt durability, the adhesiveness index in Taber's sheet abrasion resistance test should preferably be not more than 20 $\mu$m and the tensile product should preferably be not less than 50 MPa.

(4) Effects of Inorganic Fillers

As is evident from Tables 3, 4 and 5, the proportion of the inorganic filler incorporated, hard clay, calcium carbonate or silica, was not more than 30 parts by weight in Examples 12 to 20 while, in Comparative Examples 2 and Examples 30 to 33, such inorganic filler was not incorporated or was incorporated in an amount exceeding 30 parts by weight.

As is evident from Tables 7, 8 and 9, the adhesiveness index was not more than 20 $\mu$m, the belt adhesiveness was slight and, further, the tensile product of the sheet was not less than 50 MPa and the durability time was satisfactory in Examples 12 to 20. In Comparative Example 2, however, the adhesiveness index was higher than 20 $\mu$m and the belt adhesiveness was intense. When the amount of carbon black was increased, as in Examples 30, or the inorganic filler was incorporated in an amount of 40 parts by weight, as in Examples 31 to 33, the tensile product was smaller than 50 MPa and the belt durability was poor although the adhesiveness was slight. It was thus found that, for reducing the adhesiveness and retaining the tensile product at 50 MPa or above, the inorganic filler should preferably be incorporated in an amount of not more than 30 parts by weight.

(5) Effects of the Vulcanization Accelerator and the Amounts of Zinc Oxide and Magnesium Oxide Based on the Mooney scorching time (ML 125° C., $t_{35}$) data for a total of 8 samples respectively having the compositions shown in Table 11, the dependency of the Mooney scorching time (ML 125° C., $t_{35}$) value on the amounts of zinc oxide and magnesium oxide for the case where the vulcanization accelerator trimethylthiourea was used in an amount of 0.5 part by weight was determined in the form of equation (2) as shown below by regression analysis using the least squares method:

$$t = A(m1)^2 + B(m2)^2 + C(m1)(m2) + D(m1) + E(m2) + F \quad (2)$$

In the above formula (2), t is the Mooney scorching time (ML 125° C., $t_{35}$, expressed in minutes), m1 is the proportion (parts by weight) of zinc oxide and m2 is the proportion (parts by weight) of magnesium oxide.

TABLE 11

|  | Sample 1 | Sample 2 | Sample 3 | Sample 4 | Sample 5 | Sample 6 | Sample 7 | Sample 8 |
|---|---|---|---|---|---|---|---|---|
| Neoprene GS (wt. parts) | 100 | 100 | 100 | 100 | 100 | 100 | 100 | 100 |
| Carbon HAF (wt. parts) | 40 | 40 | 40 | 40 | 40 | 40 | 40 | 40 |

TABLE 11-continued

|  | Sample 1 | Sample 2 | Sample 3 | Sample 4 | Sample 5 | Sample 6 | Sample 7 | Sample 8 |
|---|---|---|---|---|---|---|---|---|
| DOS (wt. parts) | 8 | 8 | 8 | 8 | 8 | 8 | 8 | 8 |
| Stearic acid (wt. parts) | 1 | 1 | 1 | 1 | 1 | 1 | 1 | 1 |
| Zinc oxide (wt. parts) | 0 | 1 | 3 | 4 | 5 | 6 | 8 | 9 |
| Magnesium oxide (wt. parts) | 9 | 8 | 6 | 7 | 9 | 3 | 1 | 0 |
| Trimethylthiourea (wt. parts) | 0.5 | 0.5 | 0.5 | 0.5 | 0.5 | 0.5 | 0.5 | 0.5 |

As a result of regression analysis, the coefficients A to F for 0.5 part by weight of trimethylthiourea were found as follows:

$$A=0.0166, B=-0.0471, C=-3.604, D=-0.5000,$$

$$E=3.3823 \text{ and } F=4.4582.$$

Figure 7:
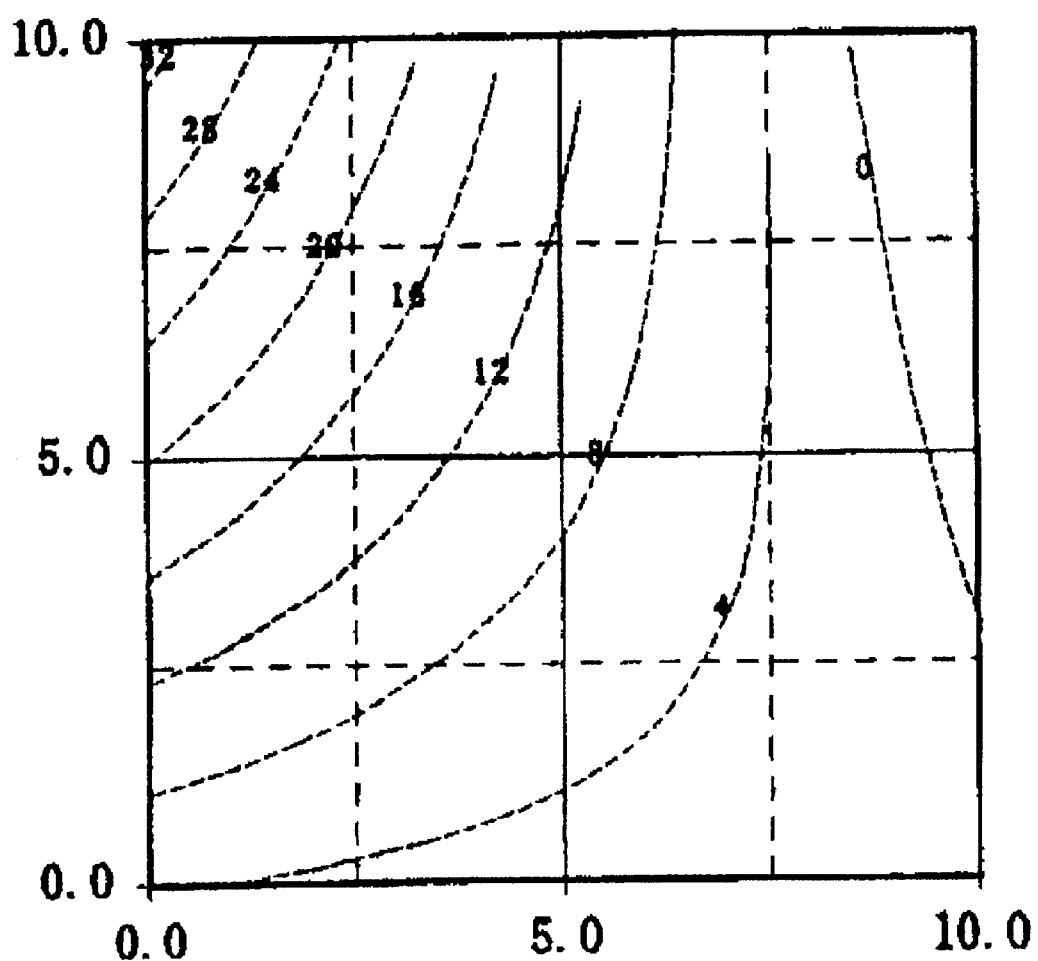
FIG. 7 is a graphic of the dependency of the Mooney scorching time (ML 125° C., $t_{35}$) on the addition amount of zinc oxide and of magnesium oxide. The ordinate denotes the amount (parts by weight) of magnesium oxide and the abscissa denotes the amount (parts by weight) of zinc oxide. The figure on each curve denotes the Mooney scorching time (ML 125° C., $t_{35}$) in minutes.
Figure 8:
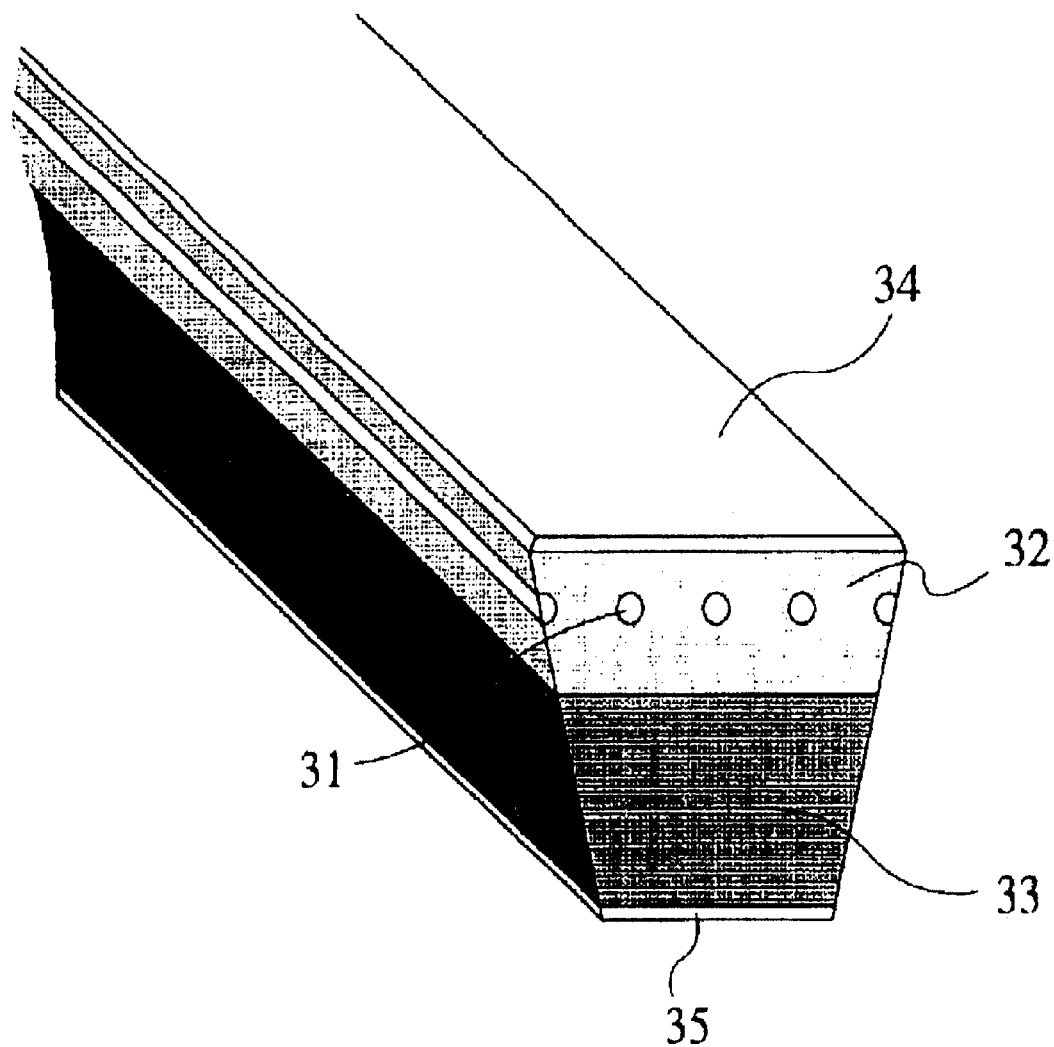
FIG. 8 is a schematic drawing, in cross section, of the power transmission belt in conventional use.

Using the above formula (2) and values of the coefficients A to F, the changes in Mooney scorching time (ML 125° C., $t_{35}$) by an effect of the amount of zinc oxide added and the amount of magnesium oxide added are shown in the form of contour lines in FIG. 7.

A standard sulfur modified chloroprene-containing rubber was prepared by compounding 100 parts by weight of Neoprene GS (trademark; product of Showa DDE Manufacturing) as the sulfur modified chloroprene rubber, 5 parts by weight of zinc oxide, 4 parts by weight of magnesium oxide, 0.5 part by weight of stearic acid and 30 parts by weight of SRF black according to the procedure prescribed in ASTM D 3190. The Mooney scorching time (ML 125° C., $t_{35}$) of the standard sulfur modified chloroprene-containing rubber was measured and found to be 12 minutes.

Based on the above values of coefficients A to F and the above Mooney scorching time (ML 125° C., $t_{35}$), the following formula (4) was obtained:

$$12 \leq 0.0166(M1)^2 - 0.0471(M2)^2 - 0.3604(M1)(M2) - 0.5000(M1) + 3.3823(M2) + 4.4582 \quad (4)$$

The compositions of Examples 21 to 25 and 34 to 37 and Comparative Examples 2 were checked as to whether the proportion M1 (parts by weight) of zinc oxide and the proportion M2 (parts by weight) of magnesium oxide satisfied the above relation represented by the above formula (4) or not.

The sulfur modified chloroprene rubber compositions of Examples 21 to 25 each satisfied the relation represented by the above formula (4) and had a Mooney scorching time (ML 125° C., $t_{35}$) of not less than 12 minutes and, as a result, their processability was comparable to that of the standard sulfur modified chloroprene-containing rubber. Further, for the sulfur modified chloroprene rubber compositions of Examples 21 to 25, it was found that adhesion wear was difficult to occur as compared with Comparative Example 2. For them, the tensile product was not less than 50 MPa and the belt durability was not less than 150 hours.

On the other hand, the sulfur modified chloroprene rubber compositions of Examples 34 to 36 were higher in rubber hardness as compared with Comparative Example 2 and no adhesion wear was observed with them, because of the use of 0.5 part by weight of trimethylthiourea as the vulcanization accelerator. Since, however, they failed to satisfy the above relation represented by the above formula (4), they showed a short Mooney scorching time (ML 125° C., $t_{35}$) and poor processability. As for Comparative Example 2, the Mooney scorching time (ML 125° C., $t_{35}$) was satisfactorily 12 minutes but, since no vulcanization accelerator was used, the crosslinking density was low and a tendency was shown toward adhesion wear. In Example 37, while the Mooney scorching time (ML 125° C., $t_{35}$) was 15 minutes and the processability was good and no adhesion wear occurred, the crosslinking density and rubber hardness were excessively high and, as a result, the tensile product was smaller than 50 MPa and the belt durability time was extremely short, namely 100 hours, since trimethylthiourea was used in an excessive amount of 5.5 parts by weight. Thus, it was found that, for attaining good belt adhesion wear preventing effect and belt durability simultaneously in addition to good elastomer composition processability, the proportion M1 (parts by weight) of zinc oxide per 100 parts by weight of the sulfur modified chloroprene rubber and the proportion M2 (parts by weight) of magnesium oxide per 100 parts by weight of the sulfur modified chloroprene rubber should preferably be determined as values satisfying the relation represented by the above formula (4).

(6) Results of Viscoelasticity Testing and GPC Measurement, and Polymerization Conditions As is evident from the tan $\delta \times (Mn)^3$ values shown in Tables 7 and 9 and from the results shown in FIG. 5, the elastomer composition raw rubbers of Examples 4 to 11, with which the adhesion wear of belts was suppressed, each had a tan $\delta \times (Mn)^3$ value not greater than $3 \times 10^{14}$, while the elastomer composition raw rubbers of Comparative Examples 2 and 3, which comprised the elastomer compositions showing high adhesiveness to belts, each had a tan $\delta \times (Mn)^3$ value greater than $3 \times 10^{14}$. In Examples 4 to 11, the amount of elemental sulfur used in the step of polymerization of chloroprene was within the range of 0.6 to 1.2 parts by weight per 100 parts by weight of the monomer. Thus, it was found that, for obtaining elastomer compositions suppressed in adhesiveness to belts, the raw material rubber should preferably be produced by using elemental sulfur in an amount within the range of 0.6 to 1.2 parts by weight per 100 parts by weight of the monomer in the step of polymerization so that a tan $\delta \times (Mn)^3$ value not greater than $3 \times 10^{14}$ may be obtained.

Further, as is evident from the low-molecular component fraction data shown in Table 7 and the graphic data shown in FIG. 6, the low-molecular component fraction was not more than 4% by weight in some of Examples 4 to 11 and the elastomer compositions of such,examples all showed suppressed adhesiveness to belts. Since all of Examples 4 to 11 do not satisfy the condition that the low-molecular component fraction should be not more than 4% by weight, said condition cannot be regarded as a necessary condition for suppressing adhesion wear. Nevertheless, said condition can be said to be at least a sufficient condition.

(7) Results of Analysis of Free-state Stabilizer Contents

As shown in Table 7, the elastomer compositions of Examples 6, 7, 10 and 11, in which the raw rubbers used contained free-state tetrathiuram disulfide in an amount within the range of 0.2 to 1.1% by weight, all showed suppressed adhesiveness to belts. On the contrary, in Comparative Examples 2 and 3 where high adhesiveness to belts was observed as shown in Table 9, the content of said free-state disulfide was found to be not less than 1.2% by weight. Thus, it was found that, for suppressing the adhesiveness to belts, a raw material rubber containing free-state tetrathiuram disulfide in an amount within the range of 0.2 to 1.1% by weight should preferably be used.

(8) Polymerization Conditions

As shown in Tables 7 and 9, the elastomer compositions of Examples 4 to 11, where the raw material rubbers used each satisfied all the conditions given hereinabove in the form of formulas (8) to (10) and at least one of the conditions given hereinabove in the form of formulas (11) to (13), showed suppressed adhesiveness to belts, whereas the elastomer compositions of Comparative Examples 2 and 3, where the raw material rubbers used satisfied none of the conditions (11) to (13), showed high adhesiveness. Thus, it was found that, for suppressing the adhesiveness to belts, a raw material rubber satisfying all the above conditions (8) to (10) and at least one of the above conditions (11) to (13) should preferably be used.

(9) Synergistic Effects

In Example 26, 20 parts by weight of calcium carbonate was added as an inorganic filler, and 0.5 part by weight of trimethylthiourea as a vulcanization accelerator, to chloroprene rubber (G1) and, for prolonging the scorching time, the amount of zinc oxide and that of magnesium oxide were set at 1 part by weight and 8 parts by weight, respectively. In Example 26, it was tested whether there was a synergistic effect between Example 16 and Example 22. A further improvement in adhesion wear preventing effect was noted.

In Example 27, it was tested whether there was a synergistic effect between Example 11 and Example 22. In that example, the X/Y value in Taber's belt abrasion resistance test was as high as 4.2 and the adhesion wear preventing effect was found improved, and the belt noise level was 0.4, indicating a further improvement.

In Example 28, it was tested whether there was a synergistic effect between Example 11 and Example 16. No adhesiveness to belts was found and a belt noise level of 0.3 was attained.

In Example 29, it was tested whether there was a synergistic effect among Example 11, Example 16 and Example 22. A further reduction in belt noise level was noted as compared with the other examples.

(10) Effects of an Inorganic Filler as Applied to Other Elastomers

Calcium carbonate (30 parts by weight) was added to the four elastomers shown in Table 10 (natural rubber, epichlorohydrin rubber, acrylic rubber and ethylene-acrylate rubber), as in Examples 38 to 41. The adhesiveness index was found reduced as compared with Comparative Examples 1, 4, 5 and 6. It was thus found that said filler is effective in preventing adhesion wear.

The elastomer composition of the present invention, which has the above constitution, is excellent in processability, capable of suppressing the adhesion wear to have an excellent durability. When power transmission belts are produced using said elastomer composition as a constituent material, the occurrence of adhesion wear during driving of the power transmission belts is suppressed, the noise level is low, abnormal sound emission is suppressed, and the power transmission belts are excellent in durability and power transmission performance.

What is claimed is:

1. A power transmission belt comprising a bottom rubber layer comprising an elastomer,
    wherein the bottom rubber layer satisfies the relation represented by the following formula (1):

$$X/Y \geq 2.5 \tag{1}$$

in the formula, X is the change in mg in the weight of said layer after 500 wear cycles under a load of 500 grams in Taber's abrasion resistance test with a sand paper (C1500) having a particle size of 10 $\mu$m as the counter material and Y is the area in $cm^2$ of contact between said counter material and the rubber face of the belt.

2. The power transmission belt according to claim 1, wherein said elastomer is a chloroprene rubber.

3. An elastomer composition wherein the particle size of the counter material of sandpaper, in the case that the change in the weight of said composition amounts to 40 mg in Taber's abrasion resistance test under the condition of 500 wear cycles and a load of 500 grams, is not greater than 20 $\mu$m.

4. The elastomer composition according to claim 3 which has a tensile product of not less than 50 MPa.

5. The elastomer composition according to claim 3 which comprises 100 parts by weight of an elastomer and 0.1 to 30 parts by weight of an inorganic filler.

6. The elastomer composition according to claim 5, wherein said inorganic filler comprises at least one member selected from the group consisting of clay, calcium carbonate and silica.

7. The elastomer composition according to claim 3, wherein said elastomer is a chloroprene rubber.

8. The elastomer composition according to claim 7 comprising a sulfur modified chloroprene rubber, a vulcanization accelerator, zinc oxide and magnesium oxide,
    the proportion M0 (in parts by weight) of said vulcanization accelerator being 0.1 to 5 parts by weight per 100 parts by weight of said sulfur-modified chloroprene rubber, the proportion M1 (in parts by weight) of said zinc oxide and the proportion M2 (in parts by weight) of said magnesium oxide, per 100 parts by weight of said sulfur-modified chloroprene rubber, satisfying the relation represented by the formula (3):

$$t1 \leq A(M1)^2 + B(M2)^2 + C(M1)(M2) + D(M1) + E(M2) + F \tag{3}$$

wherein t1 is the Mooney scorching time (ML 125° C., $t_{35}$) of a standard sulfur modified chloroprene-containing rubber (standard formulation 2A defined in ASTM 3190) composed of 100 parts by weight of said sulfur modified chloroprene rubber, 5 parts by weight of said zinc oxide, 4 parts by weight of said magnesium oxide, 0.5 part by weight of stearic acid and 30 parts by weight of SRF black and A, B, C, D, E and F are coefficients in the following formula (2):

$$t = A(m1)^2 + B(m2)^2 + C(m1)(m2) + D(m1) + E(m2) + F \quad (2)$$

as determined experimentally by preparing a plurality of compositions composed of 100 parts by weight of said sulfur modified chloroprene rubber, M0 parts by weight of said vulcanization accelerator as well as said zinc oxide and said magnesium oxide, and measuring the Mooney scorching time t (minutes) (ML 125° C., $t_{35}$) and the proportion m1 (in parts by weight) of said zinc oxide and the proportion m2 (in parts by weight) of said magnesium oxide, per 100 parts by weight of said sulfur modified chloroprene rubber, according to the type and proportion M0 (in parts by weight) of said vulcanization accelerator in each of a plurality of compositions mentioned above.

9. The elastomer composition according to claim 8, wherein the vulcanization accelerator is a thiourea compound represented by the following general formula (I):

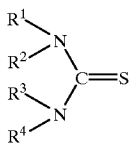
(I)

wherein $R^1$, $R^2$, $R^3$ and $R^4$ each independently represents a hydrogen atom or a hydrocarbon group containing 1 to 12 carbon atoms and at least three selected from the group consisting of $R^1$, $R^2$, $R^3$ and $R^4$ each represents a hydrocarbon group containing 1 to 12 carbon atoms.

10. The elastomer composition according to claim 8, wherein the formula (3) corresponds to the following formula (4):

$$12 \leq 0.0166(M1)^2 - 0.0471(M2)^2 - 0.3604(M1)(M2) - 0.5000(M1) + 3.3823(M2) + 4.4582 \quad (4)$$

(in the formula, M1 and M2 are the same mentioned above.).

11. The elastomer composition according to claim 7, which comprises the sulfur modified chloroprene polymer prepared by using, in the step of polymerization, 0.6 to 1.2 parts by weight of elemental sulfur per 100 parts by weight of the monomer, and the chloroprene polymer satisfying the relation represented by the following formula (5);

$$\tan \delta \times (Mn)^3 \leq 3 \times 10^{14} \quad (5)$$

wherein the tan δ represents the value obtained by linear viscoelasticity measurement in the shear mode in the raw rubber state at 120° C. and 0.1 rad/s, and Mn represents the number average molecular weight of those high-molecular components having a molecular weight of 2,500 or more as determined by gel permeation chromatography and expressed in terms of polystyrene equivalent.

12. The elastomer composition according to claim 7, comprising the sulfur modified chloroprene polymer of which the low-molecular component fraction having a molecular weight of 2,500 or less as determined by gel permeation chromatography of the tetrahydrofuran-soluble fraction and expressed in terms of polystyrene equivalent is not more than 4.0%.

13. The elastomer composition according to claim 7, comprising a sulfur modified chloroprene polymer, which comprises a homopolymer of 2-chloro-1,3-butadiene (A), or a copolymer of 2-chloro-1,3-butadiene (A) and a monomer (B) copolymerizable therewith where the proportion of said (A) is within the range 100% by weight$\geq$(A)>85% by weight and the proportion of said (B) is within the range 0% by weight<(B)$\leq$15% by weight, the homopolymer or copolymer being terminally modified with a tetraalkylthiuram disulfide (a) and/or a dialkylxanthogen disulfide (b), having alkyl groups of 1 to 6 carbon atoms, and contains 0.2 to 1.1% by weight of said (a) and/or (b) in the free state.

14. A power transmission belt comprising the elastomer composition according to claim 3 as a constituent thereof.

15. The power transmission belt according to claim 1, which comprises the elastomer composition according to claim 3 as a constituent thereof.

16. The elastomer composition according to claim 4 which comprises 100 parts by weight of an elastomer and 0.1 to 30 parts by weight of an inorganic filler.

17. The elastomer composition according to claim 4, wherein said elastomer is a chloroprene rubber.

18. The elastomer composition according to claim 5, wherein said elastomer is a chloroprene rubber.

19. The elastomer composition according to claim 6, wherein said elastomer is a chloroprene rubber.

20. The elastomer composition according to claim 9, wherein the formula (3) corresponds to the following formula (4):

$$12 \leq 0.0166(M1)^2 - 0.0471(M2)^2 - 0.3604(M1)(M2) - 0.5000(M1) + 3.3823(M2) + 4.4582 \quad (4)$$

(in the formula, M1 and M2 are the same mentioned above.).

* * * * *